(12) United States Patent  
Guedalia et al.

(10) Patent No.: US 9,131,266 B2  
(45) Date of Patent: Sep. 8, 2015

(54) AD-HOC MEDIA PRESENTATION BASED UPON DYNAMIC DISCOVERY OF MEDIA OUTPUT DEVICES THAT ARE PROXIMATE TO ONE OR MORE USERS

(71) Applicant: QUALCOMM Incorporated, San Diego, CA (US)

(72) Inventors: Isaac David Guedalia, Bet Shemesh (IL); Sarah Glickfield, Jerusalem (IL); Riva Pomerantz, Ramat Beit Shemesh A (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/962,738

(22) Filed: Aug. 8, 2013

(65) Prior Publication Data

US 2014/0047487 A1 Feb. 13, 2014

Related U.S. Application Data

(60) Provisional application No. 61/682,050, filed on Aug. 10, 2012.

(51) Int. Cl.
*H04N 7/18* (2006.01)
*H04N 21/436* (2011.01)
(Continued)

(52) U.S. Cl.
CPC ...... *H04N 21/43615* (2013.01); *H04L 12/2809* (2013.01); *H04L 65/1069* (2013.01);
(Continued)

(58) Field of Classification Search
CPC ............. H04N 21/2143; H04N 21/25825; H04N 21/25833; H04N 21/632; H04N 21/64746; H04N 21/6547

USPC .................................................... 725/74, 80, 81
See application file for complete search history.

(56) References Cited

U.S. PATENT DOCUMENTS 6,501,441 B1  12/2002  Ludtke et al.
6,583,771 B1   6/2003  Furuhashi et al.
(Continued)

FOREIGN PATENT DOCUMENTS

EP     2566281 A1    3/2013
IN   1463CHE2007    2/2009
(Continued)

OTHER PUBLICATIONS

Co-pending U.S. Appl. No. 14/255,869, filed Apr. 17, 2014.
(Continued)

*Primary Examiner* — Dominic D Saltarelli
(74) *Attorney, Agent, or Firm* — Muncy, Geissler, Olds & Lowe, P.C.

(57) ABSTRACT

In an embodiment, a device controller initiates a dynamic discovery procedure to detect media output devices that are currently in proximity to a user. The device controller determines a first subset of the detected media output devices configured to present a first media type (e.g., video, audio, etc.) to the user and a second subset of the detected media output devices configured to present a second media type (e.g., audio, video, etc.) to the user. The device controller directs first and second portions of media to the first and second subsets conjunctive presentation. In another embodiment, the first and/or second subsets can include two or more devices, such that the same media type can be presented by multiple devices (e.g., to achieve a surround sound effect, a split-screen or cloned video effect, etc.).

50 Claims, 22 Drawing Sheets

(51) Int. Cl.

| | |
|---|---|
| *H04N 21/258* | (2011.01) |
| *H04N 21/647* | (2011.01) |
| *H04N 21/214* | (2011.01) |
| *H04N 21/63* | (2011.01) |
| *H04N 21/6547* | (2011.01) |
| *H04L 12/28* | (2006.01) |
| *H04L 29/08* | (2006.01) |
| *H04N 21/431* | (2011.01) |
| *H04N 21/485* | (2011.01) |
| *H04W 4/00* | (2009.01) |
| *H04W 4/02* | (2009.01) |
| *H04W 4/08* | (2009.01) |
| *H04L 29/06* | (2006.01) |

(52) U.S. Cl.
CPC ........ *H04L65/1093* (2013.01); *H04L 65/4076* (2013.01); *H04L 67/12* (2013.01); *H04N 21/2143* (2013.01); *H04N 21/258* (2013.01); *H04N 21/25825* (2013.01); *H04N 21/25833* (2013.01); *H04N 21/4312* (2013.01); *H04N 21/4858* (2013.01); *H04N 21/632* (2013.01); *H04N 21/64746* (2013.01); *H04N 21/6547* (2013.01); *H04W 4/005* (2013.01); *H04W 4/02* (2013.01); *H04W 4/023* (2013.01); *H04W 4/08* (2013.01)

(56) References Cited

U.S. PATENT DOCUMENTS

| | | | |
|---|---|---|---|
| 6,965,785 | B2 | 11/2005 | Mager et al. |
| 7,180,475 | B2 | 2/2007 | Slobodin et al. |
| 7,716,273 | B2 | 5/2010 | Soin et al. |
| 7,843,401 | B2 | 11/2010 | Morikawa et al. |
| 8,457,557 | B2 | 6/2013 | Alden |
| 2002/0196378 | A1* | 12/2002 | Slobodin et al. .............. 348/744 |
| 2003/0179154 | A1* | 9/2003 | Demsky et al. ................. 345/1.1 |
| 2003/0236889 | A1 | 12/2003 | Manion et al. |
| 2004/0090924 | A1* | 5/2004 | Giaimo et al. ................ 370/252 |
| 2005/0128958 | A1* | 6/2005 | Hamdan ....................... 370/254 |
| 2005/0240680 | A1 | 10/2005 | Costa-Requena et al. |
| 2006/0028398 | A1 | 2/2006 | Willmore |
| 2006/0071947 | A1* | 4/2006 | Ubillos et al. ................. 345/648 |
| 2008/0036875 | A1 | 2/2008 | Jones et al. |
| 2008/0211825 | A1 | 9/2008 | Sunakawa et al. |
| 2008/0216125 | A1 | 9/2008 | Li et al. |
| 2008/0259093 | A1 | 10/2008 | Tseng |
| 2009/0160731 | A1 | 6/2009 | Schuler et al. |
| 2010/0141552 | A1 | 6/2010 | Ferlitsch et al. |
| 2010/0293264 | A1* | 11/2010 | Ramsay ........................ 709/223 |
| 2010/0328447 | A1 | 12/2010 | Watson |
| 2011/0109526 | A1 | 5/2011 | Bauza et al. |
| 2011/0238751 | A1 | 9/2011 | Belimpasakis et al. |
| 2012/0062442 | A1 | 3/2012 | Locker et al. |
| 2012/0063603 | A1 | 3/2012 | Evans et al. |
| 2012/0133674 | A1 | 5/2012 | Takishita et al. |
| 2012/0146891 | A1 | 6/2012 | Kalinli |
| 2012/0184304 | A1 | 7/2012 | Walsh et al. |
| 2012/0269360 | A1 | 10/2012 | Burke |
| 2012/0326945 | A1 | 12/2012 | Ellis et al. |
| 2013/0083240 | A1 | 4/2013 | Kerr et al. |
| 2013/0093659 | A1 | 4/2013 | Nomura et al. |
| 2013/0109364 | A1 | 5/2013 | Mercuri et al. |
| 2013/0181901 | A1 | 7/2013 | West |
| 2013/0265487 | A1 | 10/2013 | Yu et al. |
| 2014/0006587 | A1* | 1/2014 | Kusano ......................... 709/224 |
| 2014/0040364 | A1* | 2/2014 | Baldwin et al. .............. 709/204 |

FOREIGN PATENT DOCUMENTS

| | | |
|---|---|---|
| WO | 2011057271 A1 | 5/2011 |
| WO | 2011134318 A1 | 11/2011 |
| WO | 2011135283 A2 | 11/2011 |
| WO | 2012153290 A1 | 11/2012 |
| WO | 2013036237 A1 | 3/2013 |

OTHER PUBLICATIONS

Co-pending U.S. Appl. No. 14/255,891, filed Apr. 17, 2014.
Co-pending U.S. Appl. No. 14/255,901, filed Apr. 17, 2014.
International Search Report and Written Opinion—PCT/US2013/054347—ISA/EPO—Dec. 4, 2013.
Kado Y., et al., "Digital scope on communication sheet for media interaction", Multimedia and Expo (ICME), 2010 IEEE International Conference on, IEEE, Piscataway, NJ, USA, Jul. 19, 2010, pp. 974-979, XP031760995, ISBN: 978-1-4244-7491-2.

* cited by examiner

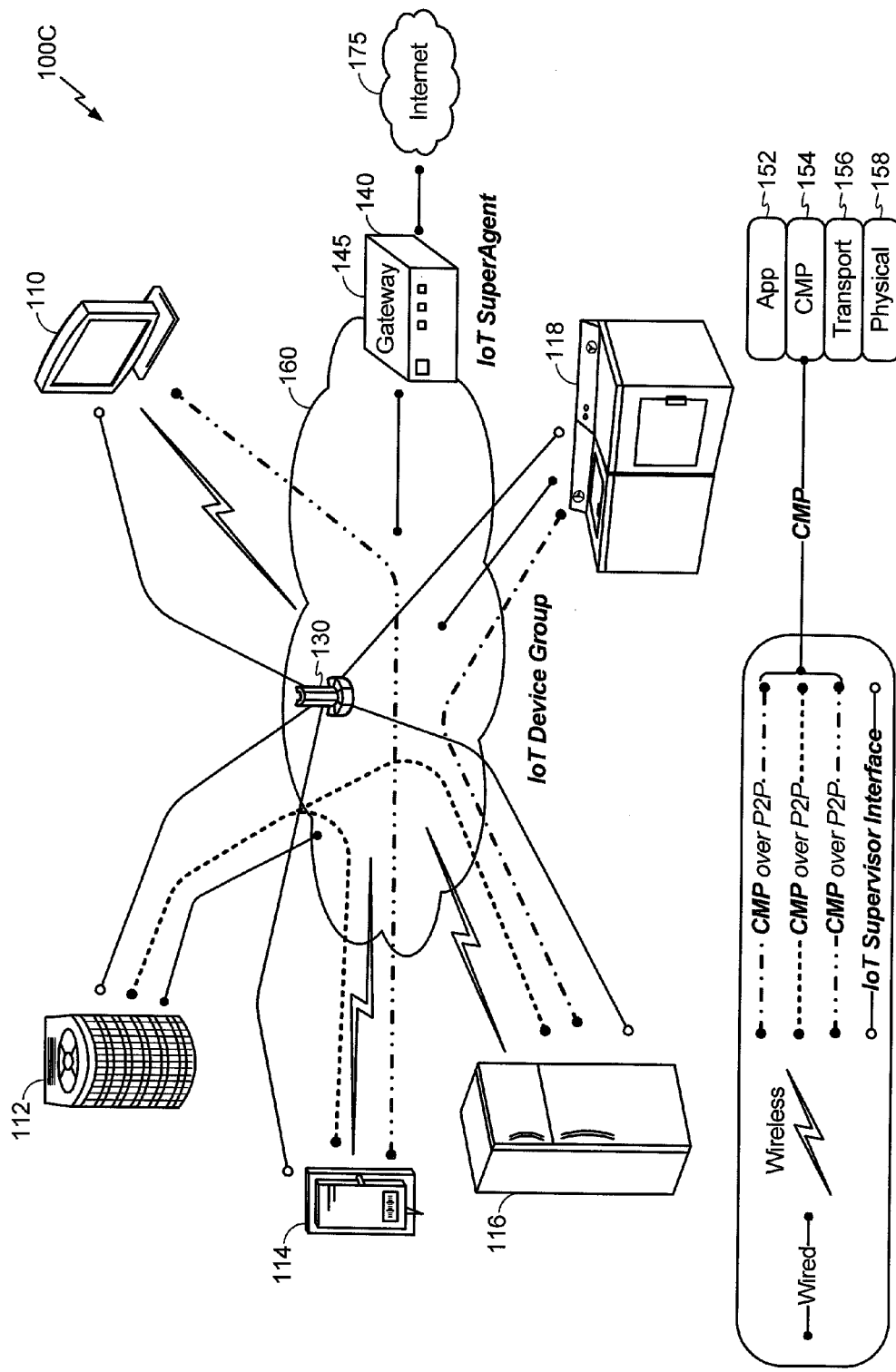

AD-HOC MEDIA PRESENTATION BASED UPON DYNAMIC DISCOVERY OF MEDIA OUTPUT DEVICES THAT ARE PROXIMATE TO ONE OR MORE USERS

CLAIM OF PRIORITY UNDER 35 U.S.C. §119

The present application for patent claims priority to Provisional Application No. 61/682,050 entitled "AD-HOC MEDIA PRESENTATION BASED UPON DYNAMIC DISCOVERY OF MEDIA OUTPUT DEVICES THAT ARE PROXIMATE TO ONE OR MORE USERS", filed Aug. 10, 2012, by the same inventors as the subject application, assigned to the assignee hereof and hereby expressly incorporated by reference herein.

BACKGROUND OF THE INVENTION

1. Field of the Invention

Embodiments of the invention relate to ad-hoc media presentation based upon dynamic discovery of media output devices that are proximate to one or more users.

2. Description of the Related Art

Media output devices are typically embedded in media source devices (e.g., speakers on a cell-phone or laptop computer, the display on a cell-phone or laptop computer), or are set-up in a fixed configuration (e.g., a surround-sound speaker system with speakers in fixed locations in a room connected to a receiver and/or a media source, a display device or television coupled to the receiver and/or the media source). However, it is generally difficult to set-up a mobile devices to connect to proximate media output devices in their current environment. For example, assume a user is at his/her friend's house and is operating a cell phone and wants to play a song stored on the cell phone over speakers at the friend's house. The user can manually set-up connections to the speakers (e.g., via a wired or wireless connection to a receiver that is connected to the speakers, etc.) and then play the song, but the process of setting up the connection between the cell phone and the speakers can be somewhat cumbersome.

SUMMARY

In an embodiment, a device controller initiates a dynamic discovery procedure to detect media output devices that are currently in proximity to a user. The device controller determines a first subset of the detected media output devices configured to present a first media type (e.g., video, audio, etc.) to the user and a second subset of the detected media output devices configured to present a second media type (e.g., audio, video, etc.) to the user. The device controller directs first and second portions of media to the first and second subsets conjunctive presentation. In another embodiment, the first and/or second subsets can include two or more devices, such that the same media type can be presented by multiple devices (e.g., to achieve a surround sound effect, a split-screen or cloned video effect, etc.).

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 1C illustrates a high-level system architecture of a wireless communications system in accordance with an aspect of the disclosure.

FIG. 2A illustrates an exemplary Internet of Things (IoT) device in accordance with aspects of the disclosure, while

DETAILED DESCRIPTION

Figure 1A:
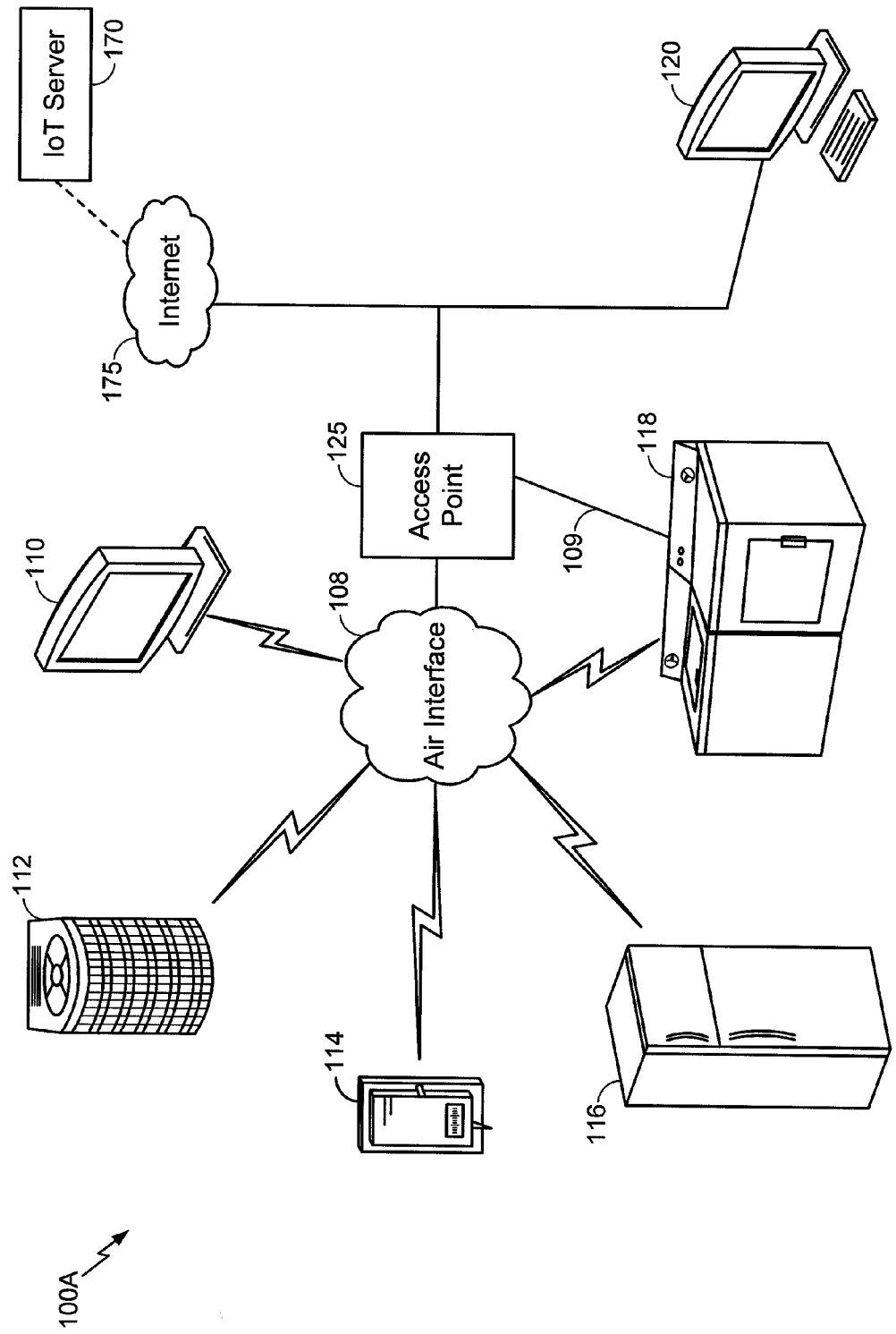
FIG. 1A illustrates a high-level system architecture of a wireless communications system in accordance with an aspect of the disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action (e.g., described in more detail below with respect to FIG. 2).

Certain embodiments of the invention relate to (or are at least compatible with) Internet of Things (IoT) implementations. As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
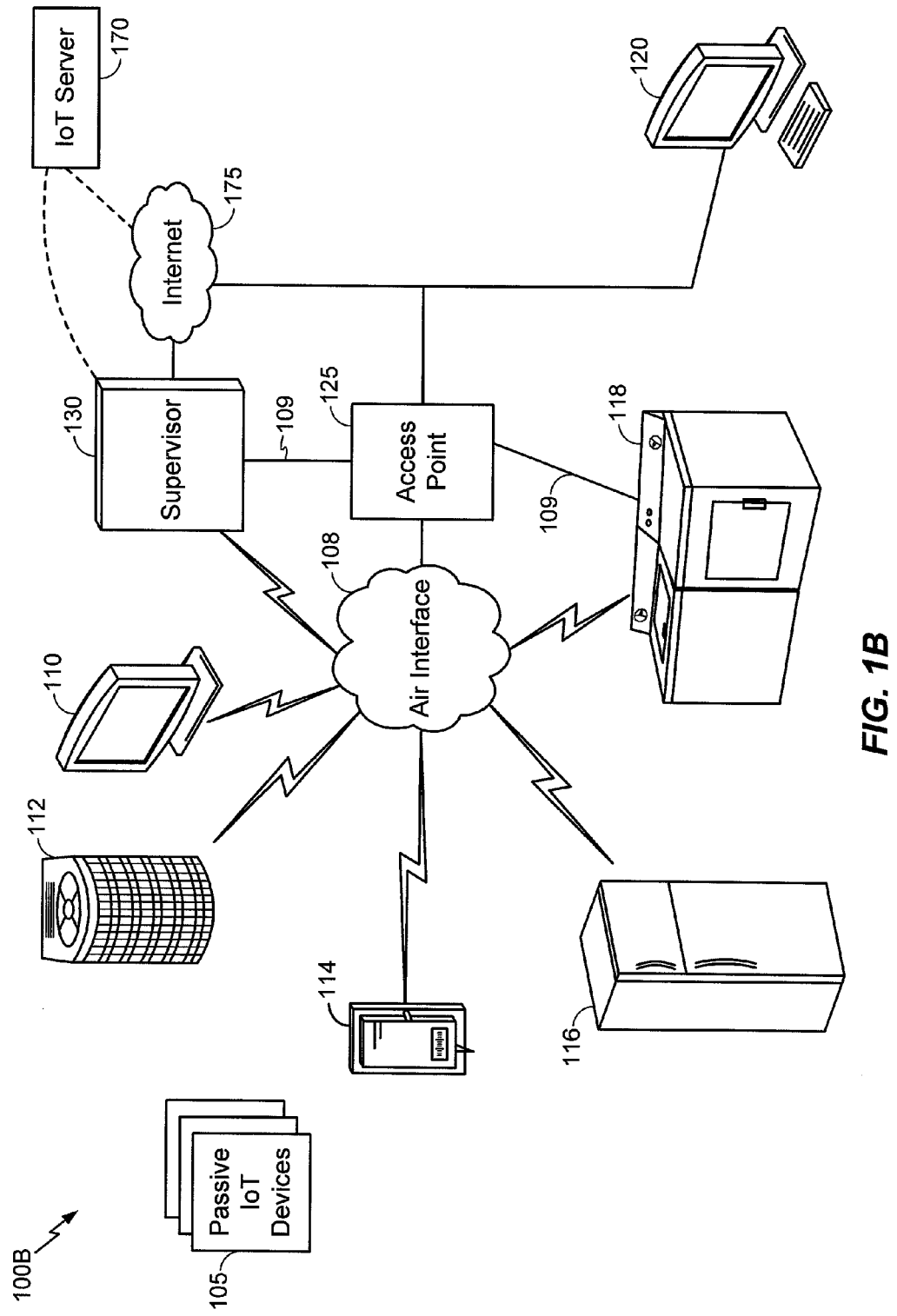
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
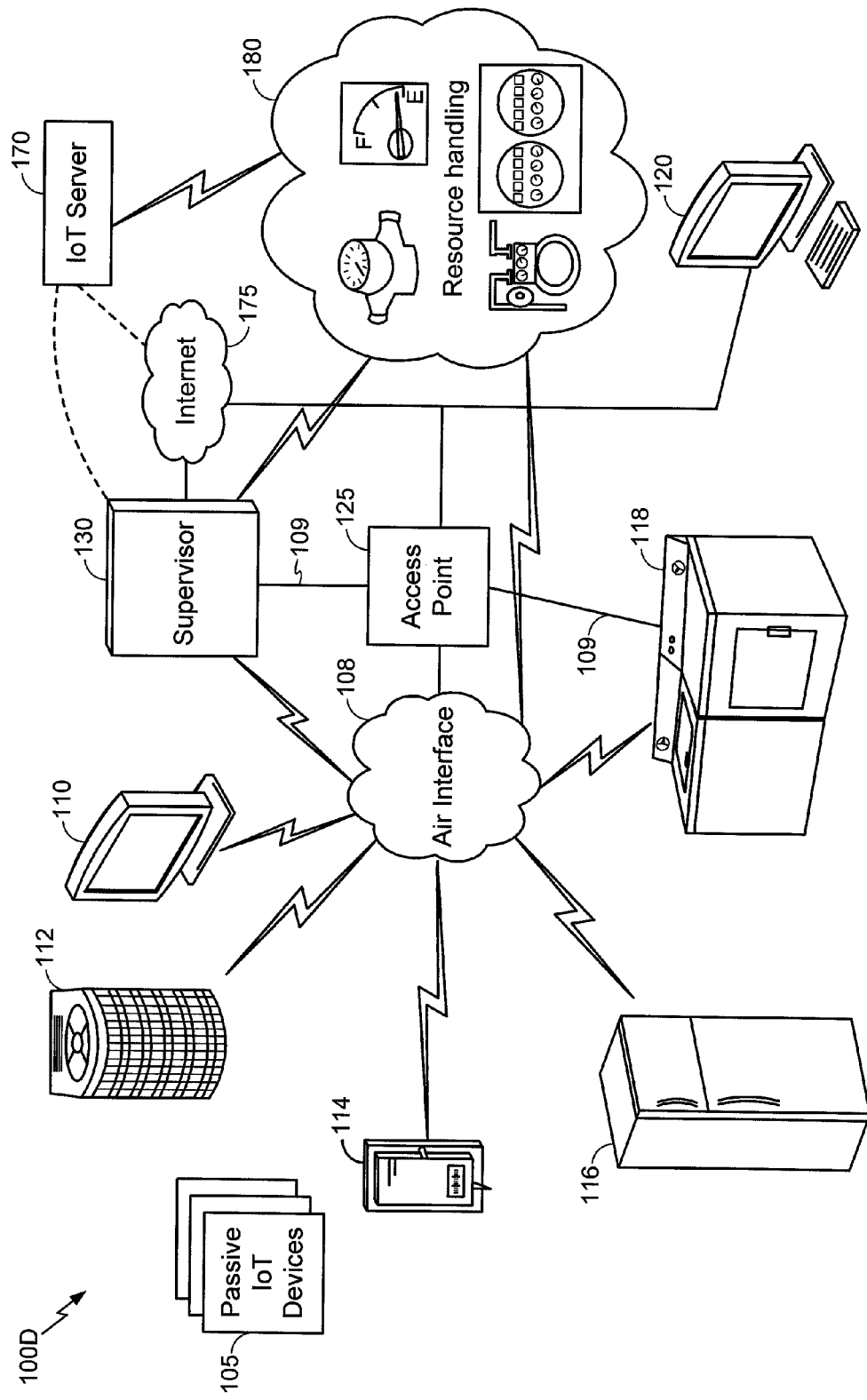
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
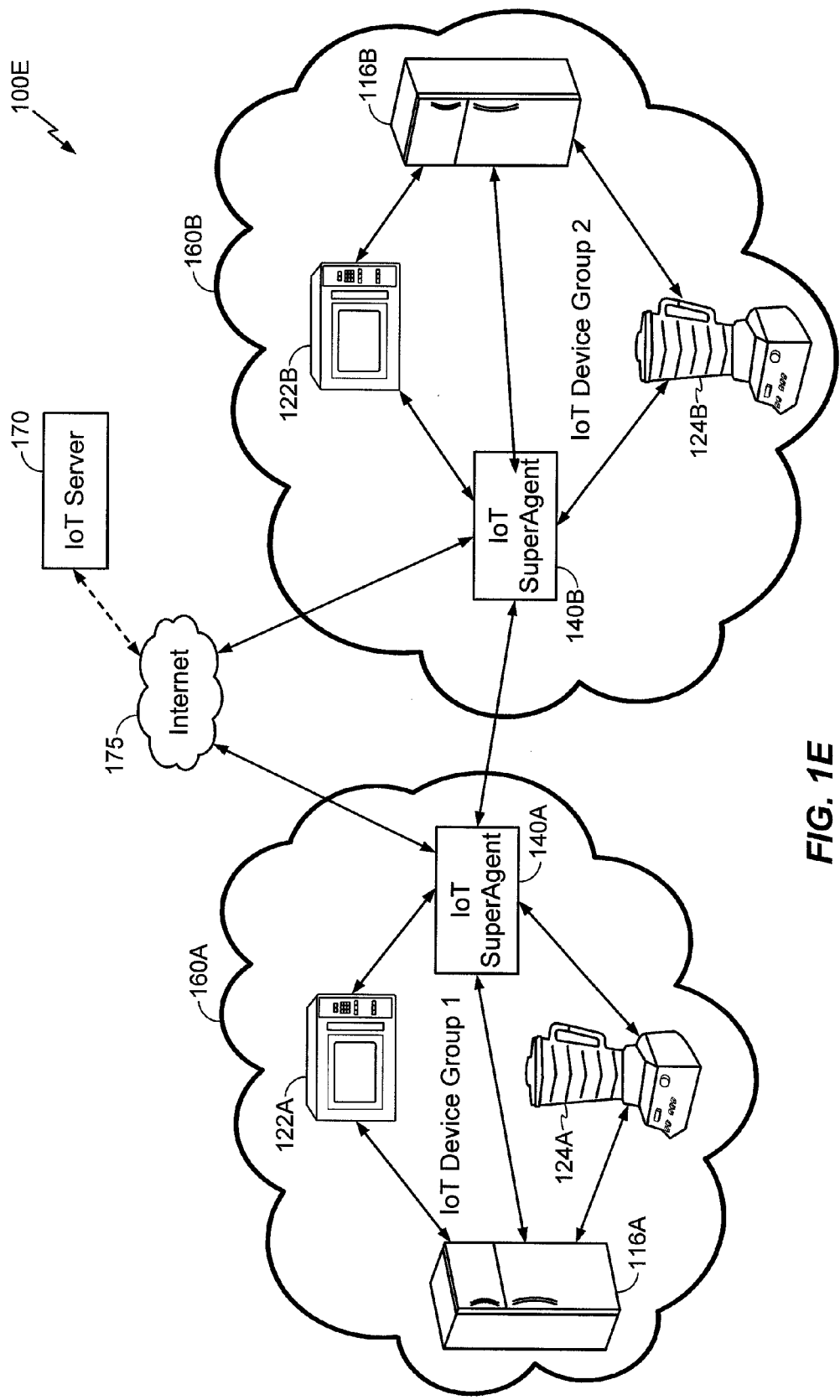
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
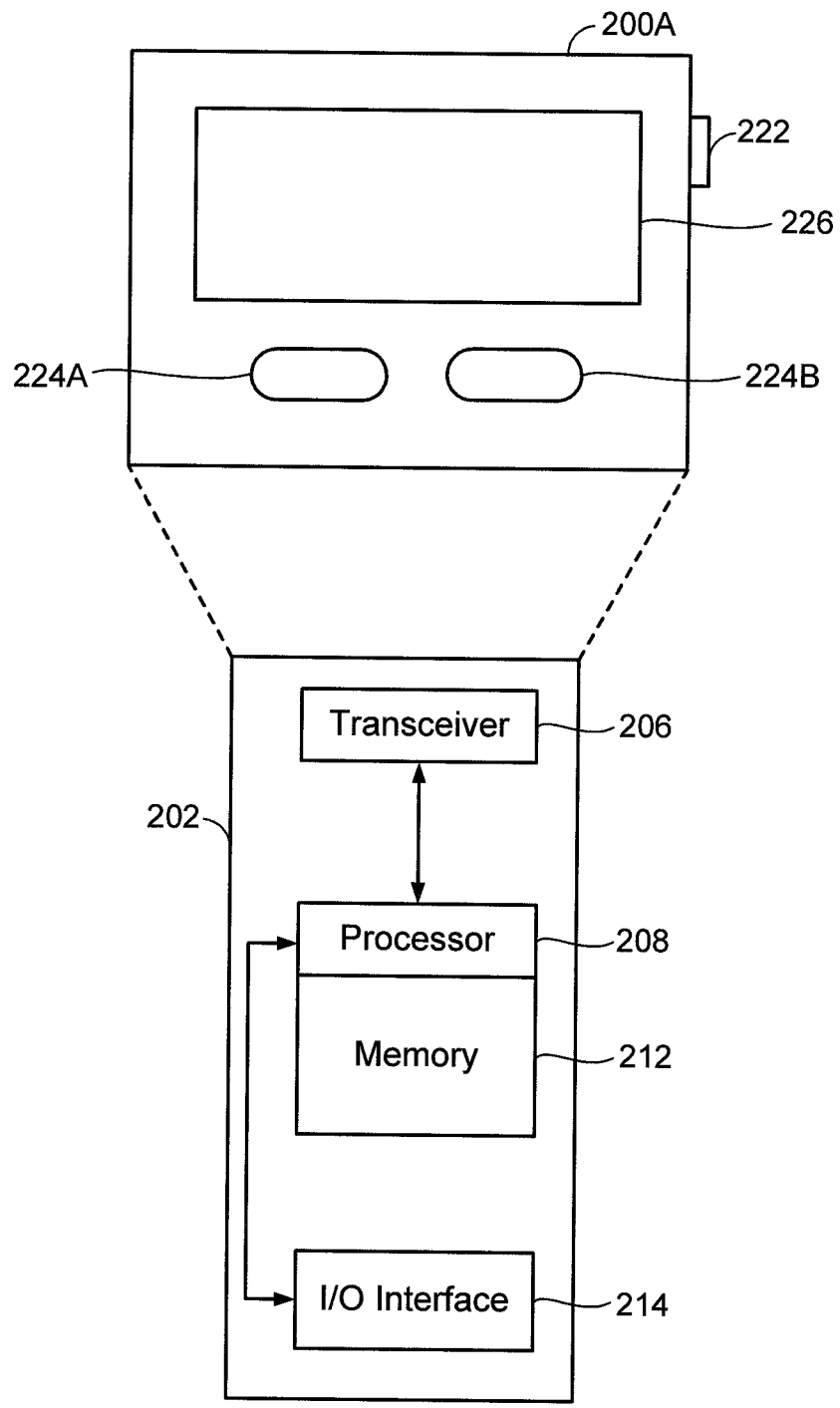

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
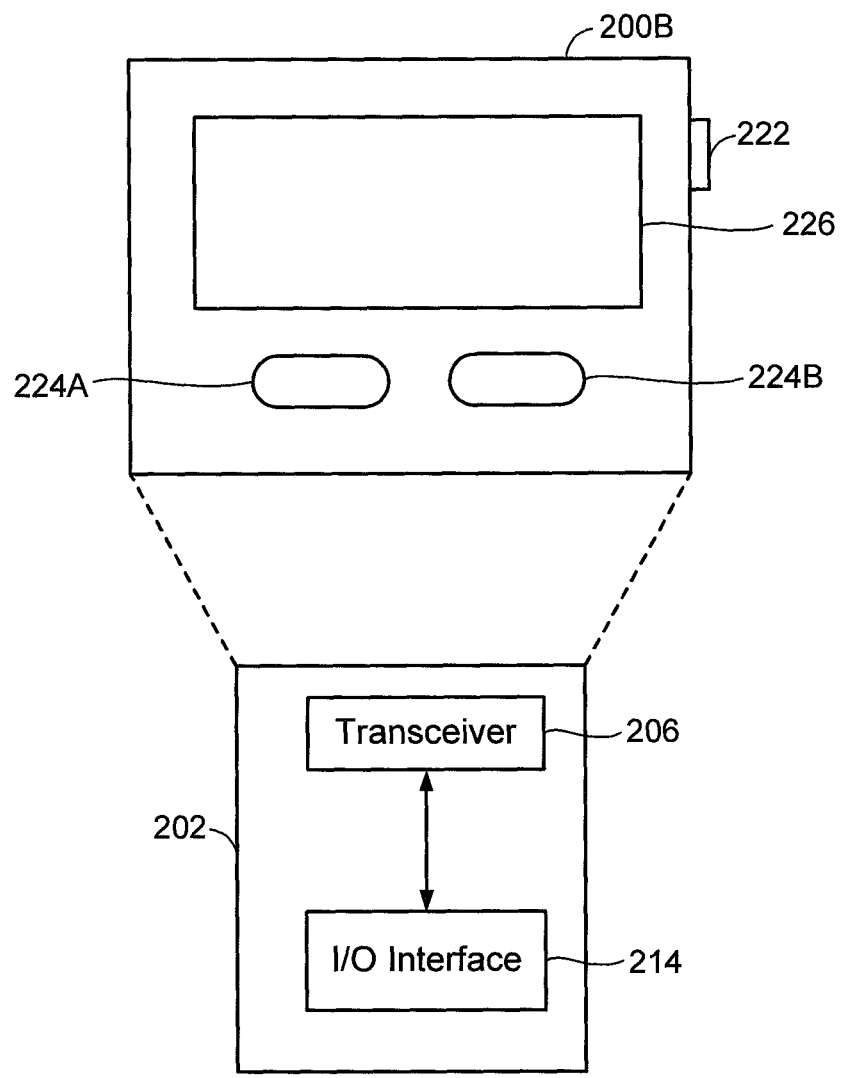
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
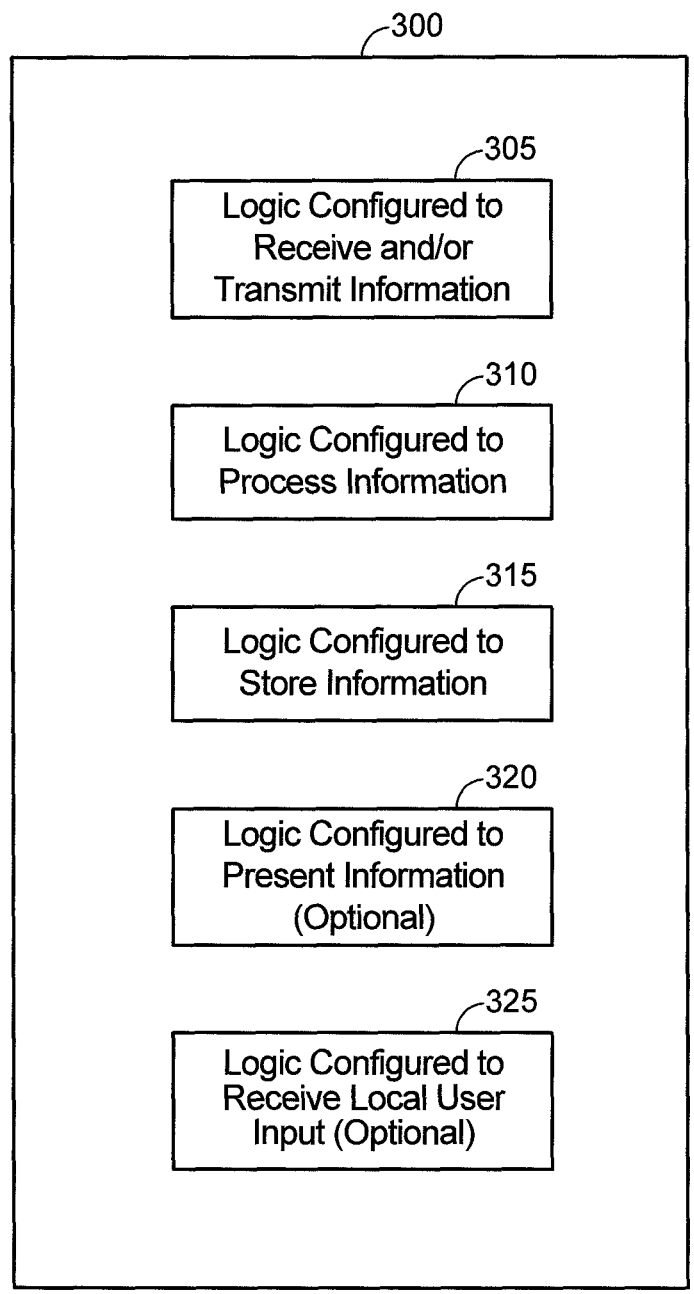
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
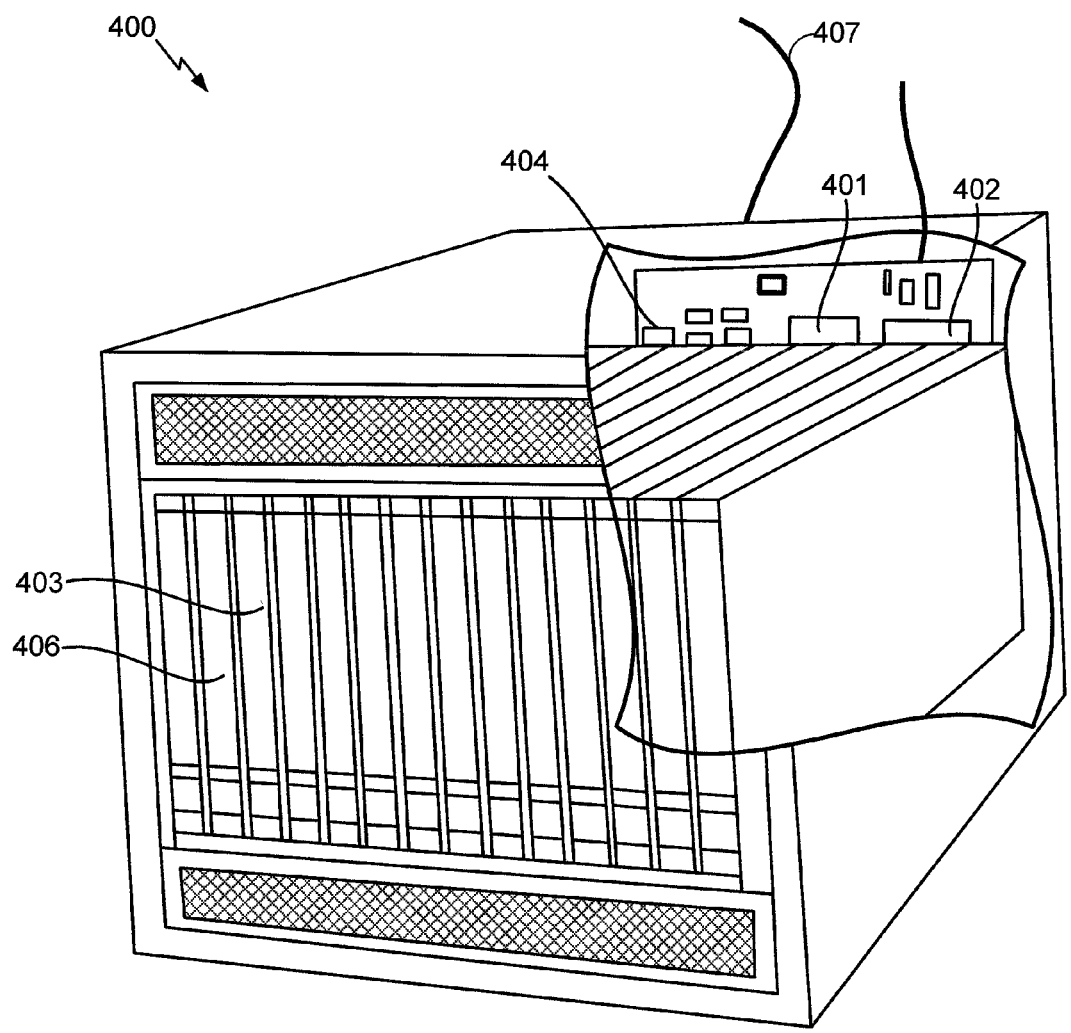
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
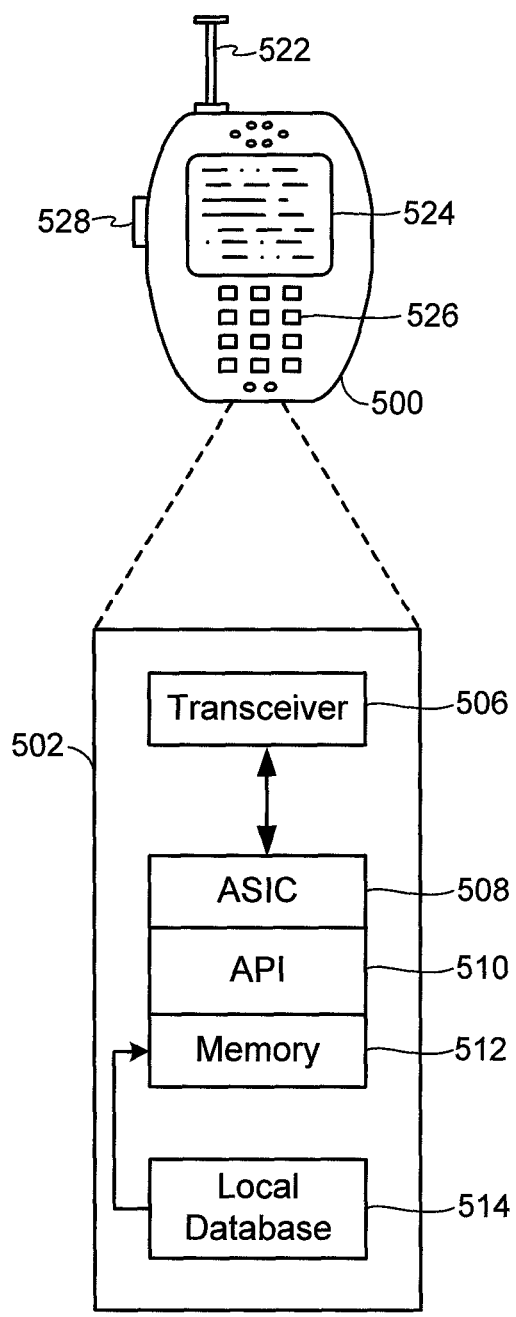
FIG. 5 is an illustration of a user equipment (UE) in accordance with at least one embodiment of the invention.

Further, while most of the discussion above relates to IoT embodiments of the invention are also directed to non-IoT environments. With this in mind, FIG. 5 illustrates a user equipment (UE) in accordance to an embodiment of the invention. The UE illustrated in FIG. 5 may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals. The UE in FIG. 5 may be implemented as either an IoT device or a non-IoT device.

Referring to FIG. 5, a UE 500, (here a wireless device), such as a cellular telephone, has a platform 502 that can receive and execute software applications, data and/or commands transmitted from an access network associated with a given radio access technology (e.g., long term evolution (LTE), EV-DO, wideband code division multiple access (W-CDMA), etc.) may ultimately come from a core network, the Internet and/or other remote servers and networks. The platform 502 can include a transceiver 506 operably coupled to an application specific integrated circuit ("ASIC") 508, or other processor, microprocessor, logic circuit, or other data processing device. The ASIC 508 or other processor executes the application programming interface ("API") 510 layer that interfaces with any resident programs in the memory 512 of the wireless device. The memory 512 can be comprised of read-only or random-access memory (RAM and ROM), EEPROM, flash cards, or any memory common to computer platforms. The platform 502 also can include a local database 514 that can hold applications not actively used in memory 512. The local database 514 is typically a flash memory cell, but can be any secondary storage device as known in the art, such as magnetic media, EEPROM, optical media, tape, soft or hard disk, or the like. The internal platform 502 components can also be operably coupled to external devices such as antenna 522, display 524, push-to-talk button 528 and keypad 526 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 508, memory 512, API 510 and local database 514 may all be used cooperatively to load, store and execute the various functions disclosed herein and thus the logic to perform these functions may be distributed over various elements. Alternatively, the functionality could be incorporated into one discrete component. Therefore, the features of the UE 500 in FIG. 5 are to be considered merely illustrative and the invention is not limited to the illustrated features or arrangement. Further, FIG. 5 helps to demonstrate that another potential implementation example of the communication device 300, whereby the communication device 300 is either an IoT device or a non-IoT device.

The wireless communication between the UE 500 and a serving access network can be based on different radio access technologies, such as LTE, CDMA, W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between UE 500, one or more Node B(s), and a radio network controller (RNC). The RNC can be connected to multiple data networks such as the core network, PSTN, the Internet, a virtual private network, a SGSN, a GGSN and the like, thus allowing UE 500 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Conventionally, preset media output systems (e.g., surround sound TV systems with fixed speakers and display devices, or single devices such as cell phones or tablet PCs) are used to output media. However, to leverage the output capabilities of local media output devices in dynamic settings, manual set-up is typically required (e.g., the user physically connects media output cables to the local media output devices, etc.).

Figure 6:
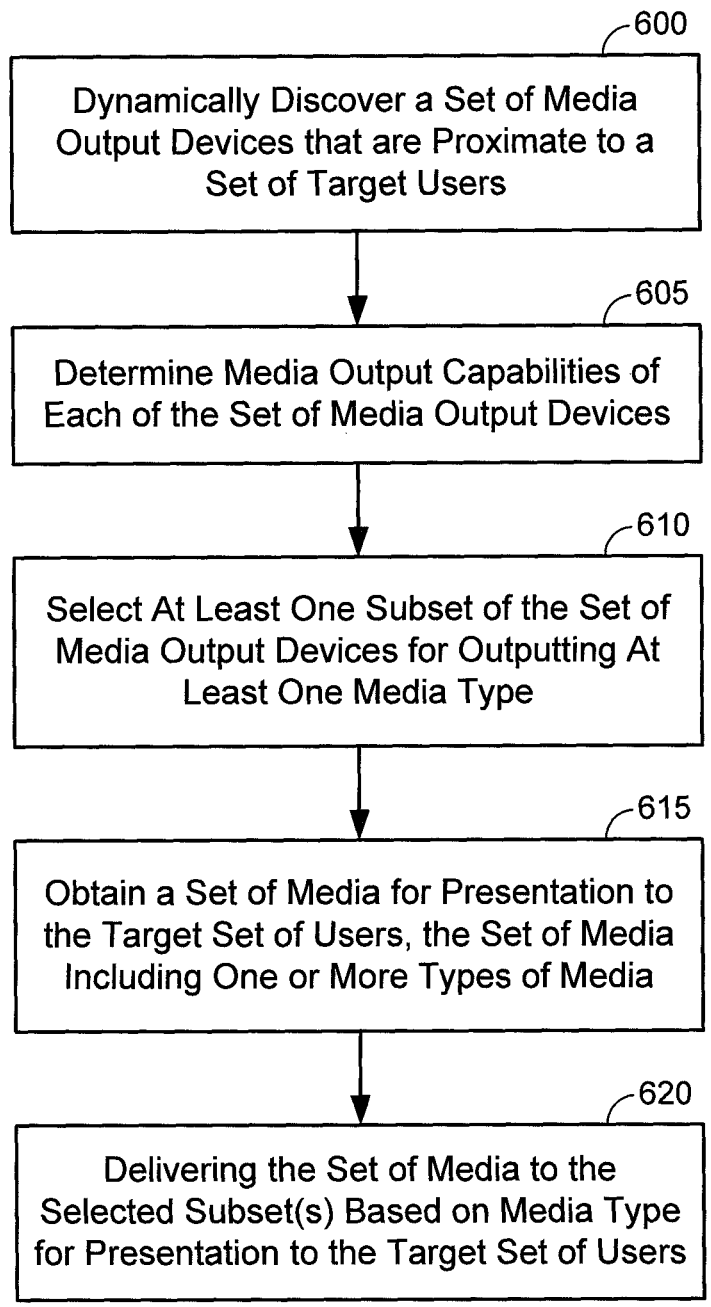
FIG. 6 illustrates a process of setting up an ad-hoc media presentation session in accordance with an embodiment of the invention.

FIG. 6 illustrates a process of setting up an ad-hoc media presentation session in accordance with an embodiment of the invention. The process of FIG. 6 is implemented at a device controller, a rendering device or a combination of both. As used herein, the device controller corresponds to a UE or to a server that is either local or remote (from the perspective of the media output devices) that will be presenting media during the session), and is responsible for making decisions related to selections of one or more media output devices for outputting particular types of media. On the other hand, the rendering device corresponds to a UE or to a server that is either local or remote (from the perspective of the media output devices) that renders one or more types of media for presentation on the media output devices selected by the device controller, and then delivers the rendered media to the selected media output device(s) for presentation thereon. The device controller and the rendering device can either correspond to independent electronic devices (e.g., as in FIGS. 7A-7D) or can be consolidated within a single device (e.g., as in FIGS. 8A-9E). Also, the device controller and the rendering device can be implemented as IoT devices (or as a consolidated single IoT device) or as non-IoT devices (or as a consolidated single non-IoT device)

Referring to FIG. 6, the device controller and/or the rendering device dynamically discover a set of media output devices that are proximate to a set of target users, 600. The set of target users can correspond to a single user, a group of users at the same approximate location (e.g., a media room of a house), or to a group of users at different locations of a shared event (e.g., at different seats in a stadium in view of a sports game). The dynamic discovery of 600 can occur in response to a request received at the device controller and/or the rendering device for outputting a set of media to the set of target users. In an example, the request can be received at the device controller directly from one or more of the set of target users if the device controller corresponds to a UE (e.g., 705A of FIG. 7A, 705C of FIG. 7C or 705D of FIG. 7D), the request can be implicit via registration from one or more of the set of target users with the device controller and/or the rendering device (e.g., 800A of FIG. 8A), the request can be received from an operator of the device controller and/or the rendering device if the device controller and/or the rendering device corresponds to a local or remote server (e.g., 900A of FIG. 9A), the request can be received at the rendering device from the device controller if the rendering device and device controller are independent entities (e.g., 705A of FIG. 7A, 705C of FIG. 7C or 705D of FIG. 7D), and so on. Alternatively, the dynamic discovery procedure can be a background operation that is performed on a periodic basis so that the set of media output devices in proximity to the set of target users is maintained as "fresh".

Figure 7A:
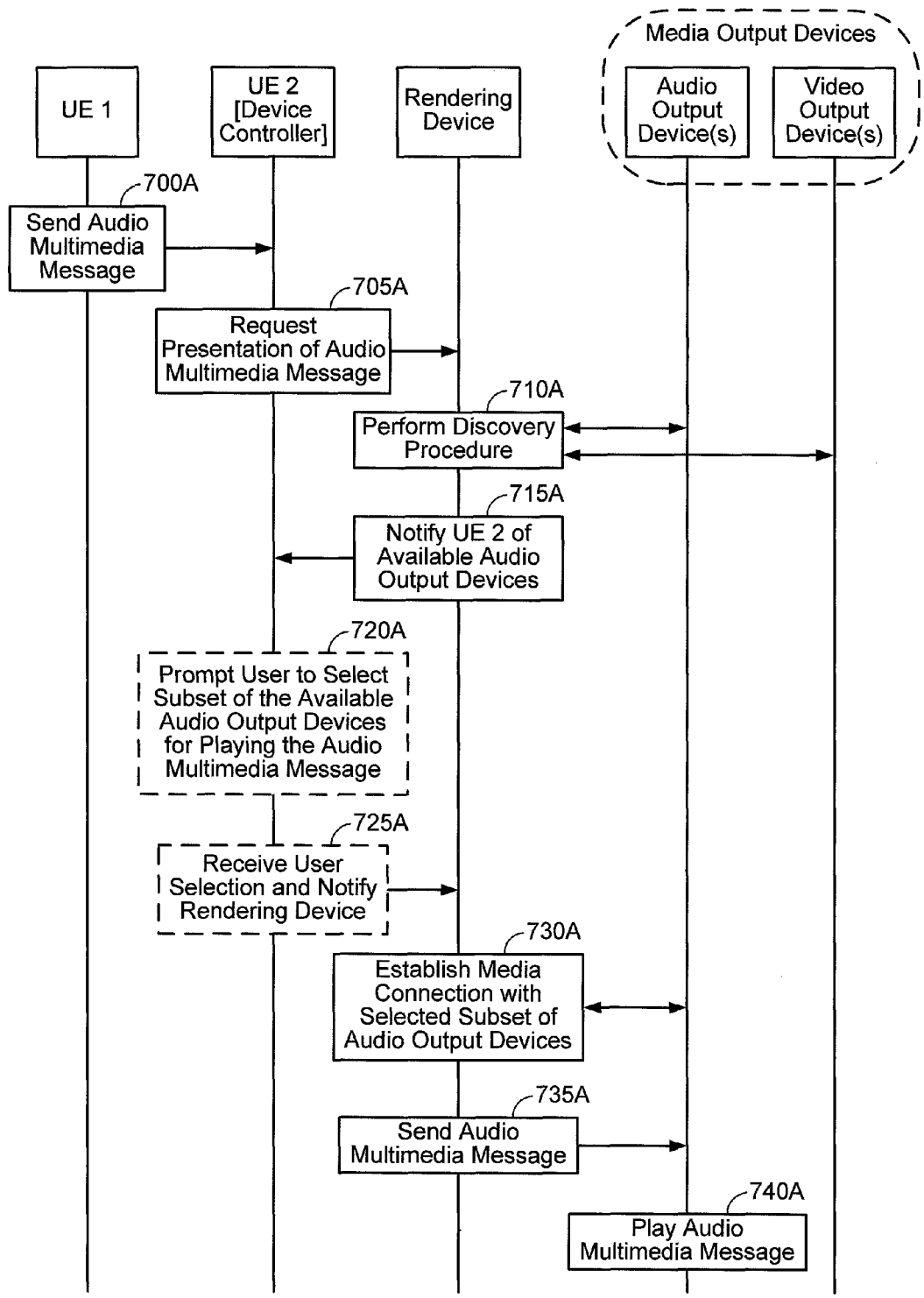
FIG. 7A illustrates an example implementation of FIG. 6 in accordance with an embodiment of the invention.
Figure 7B:
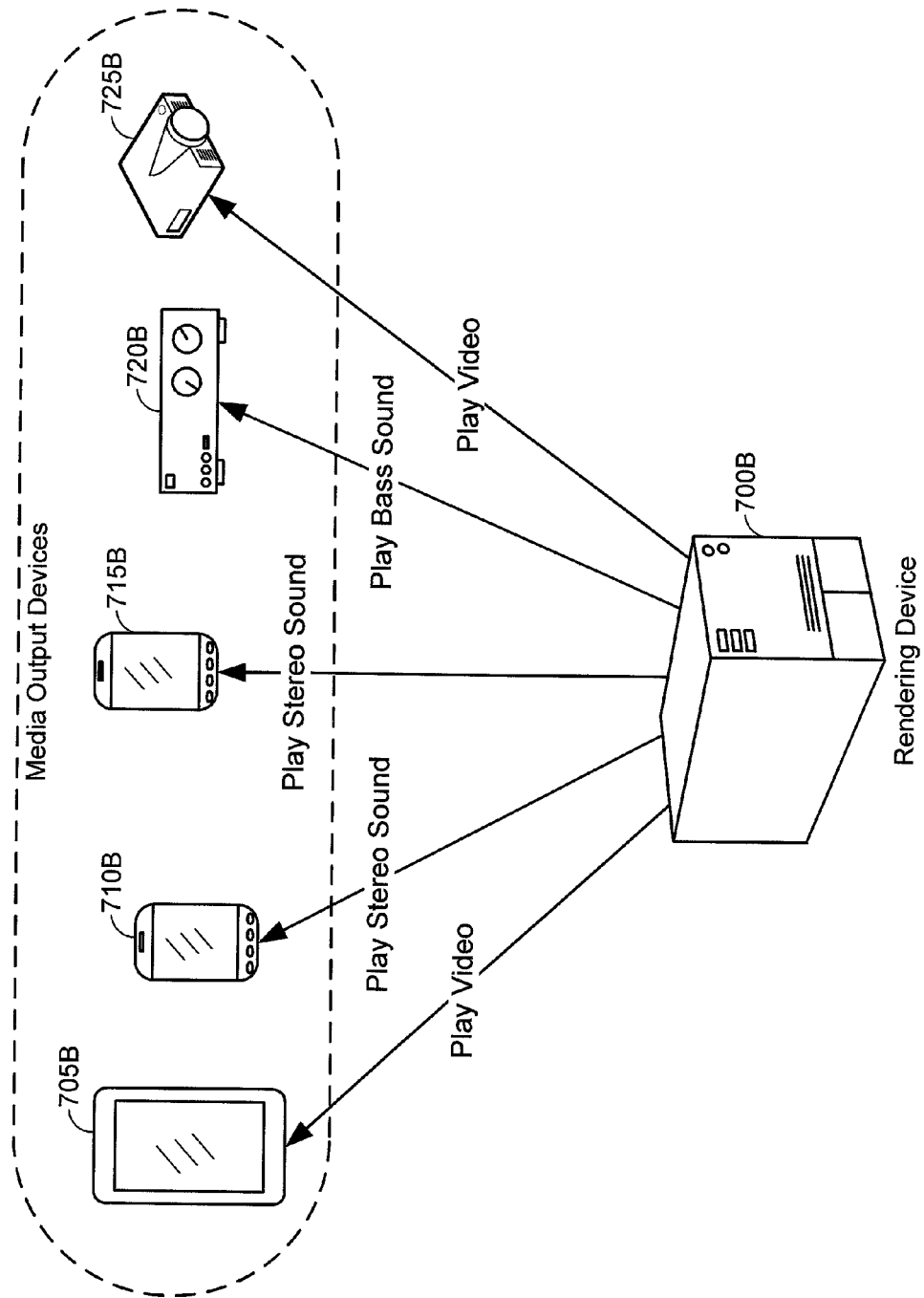
FIG. 7B illustrates an example media output device configuration in accordance with an embodiment of the invention.
Figure 7C:
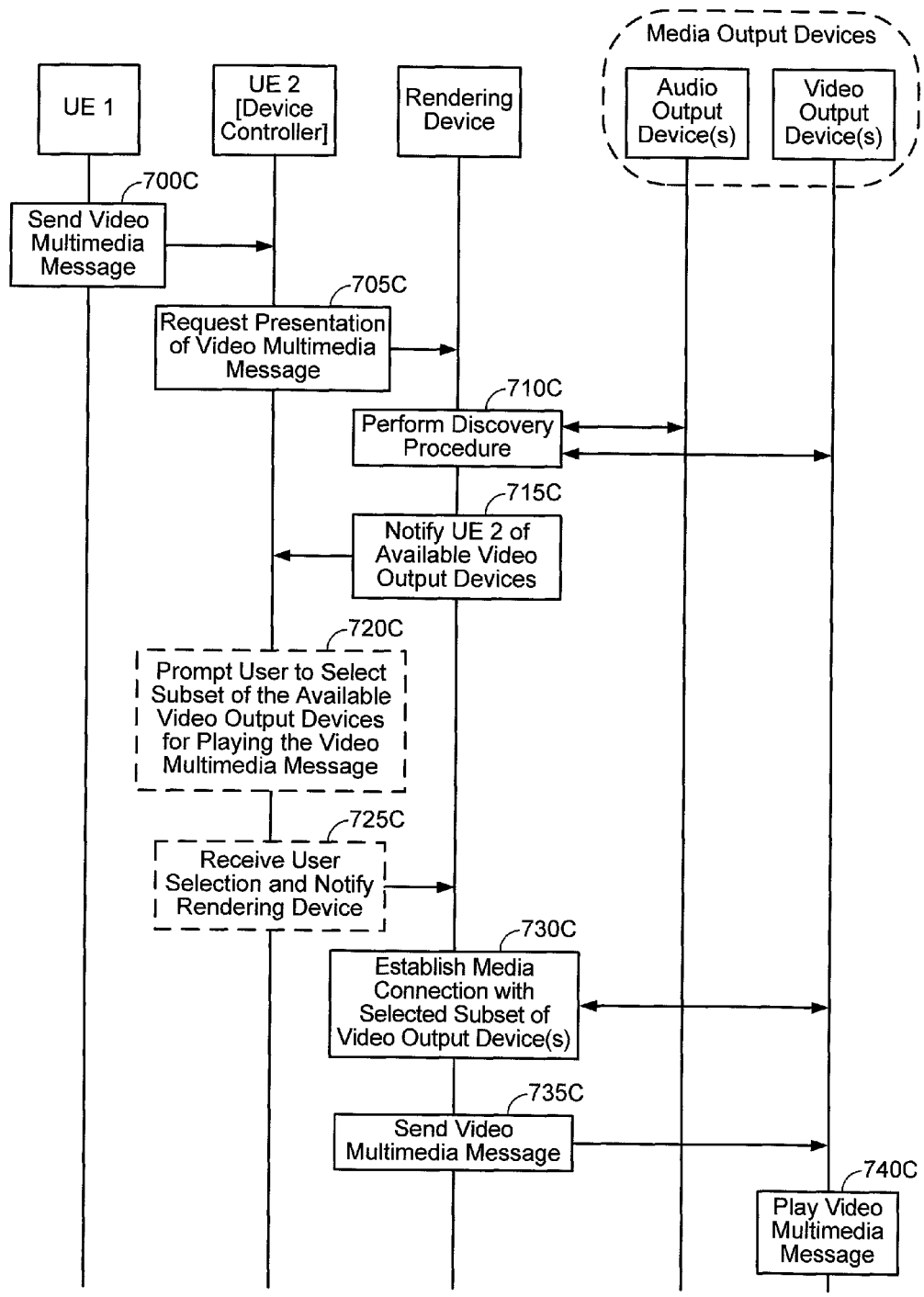
FIG. 7C illustrates an example implementation of FIG. 6 in accordance with another embodiment of the invention.
Figure 7D:
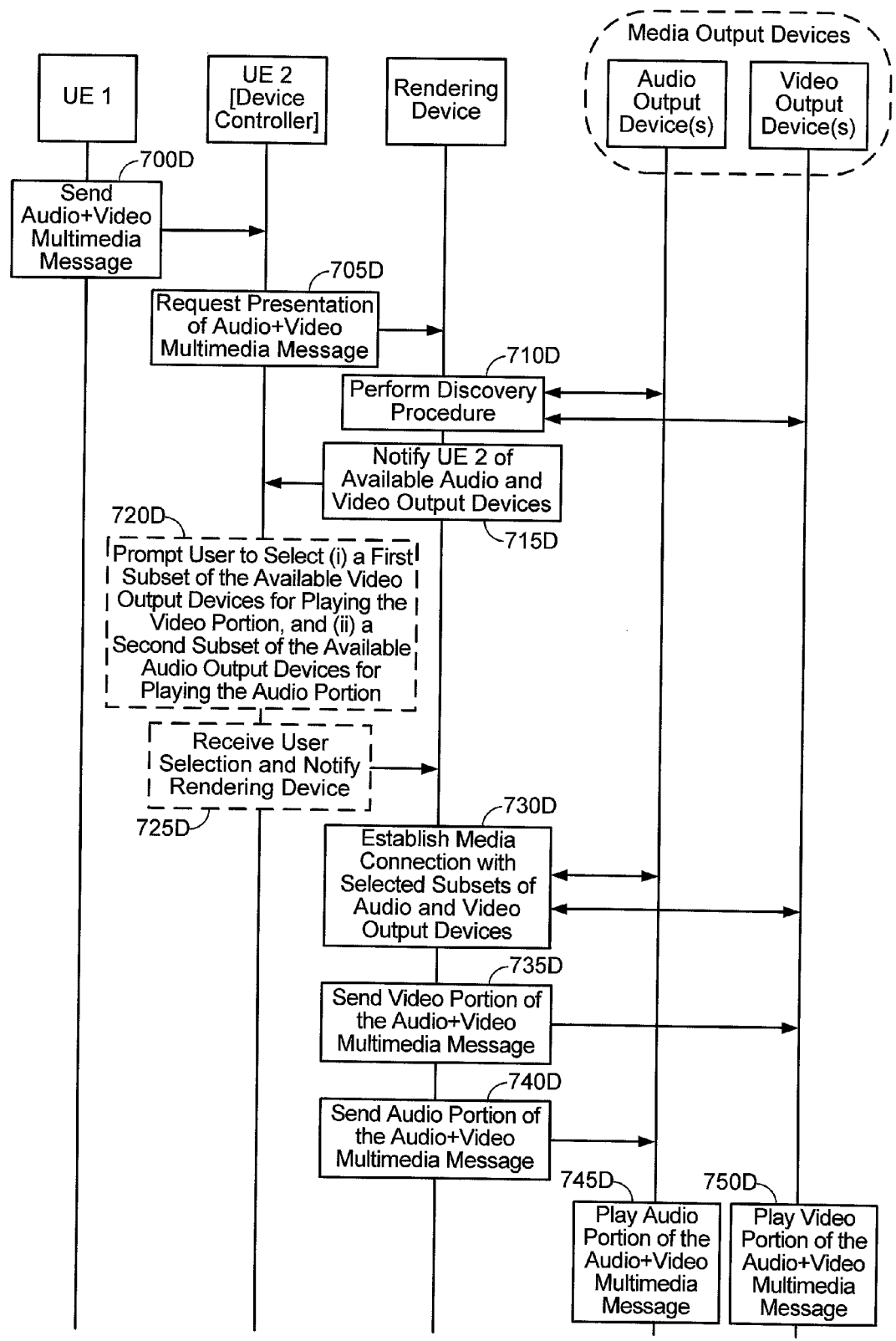
FIG. 7D illustrates an example implementation of FIG. 6 in accordance with another embodiment of the invention.
Figure 8A:
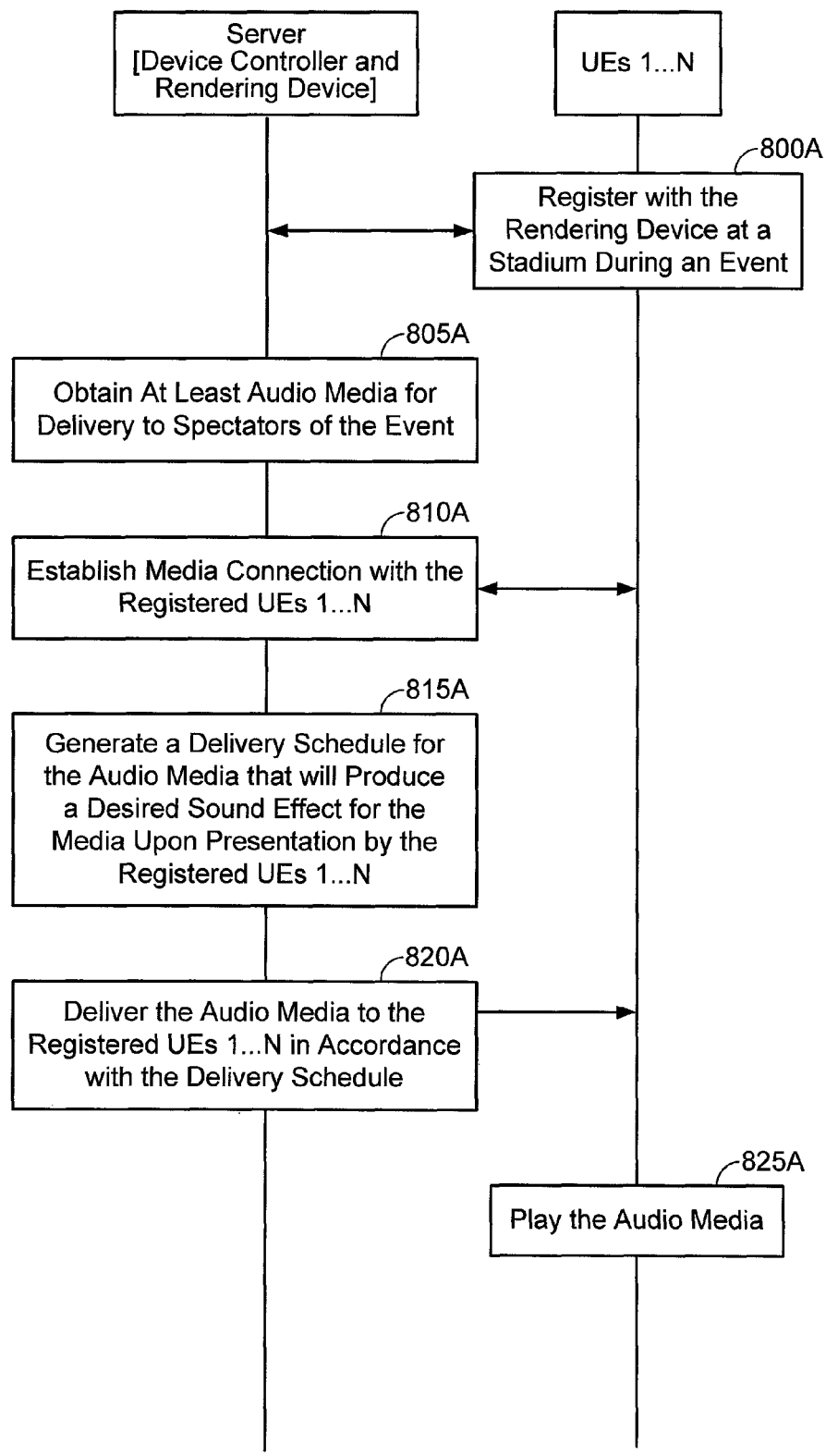
FIG. 8A is directed to an example implementation of the process of FIG. 6 with respect to ad-hoc group delivery of media to a set of target spectators of an event in accordance with another embodiment of the invention.
Figure 9A:
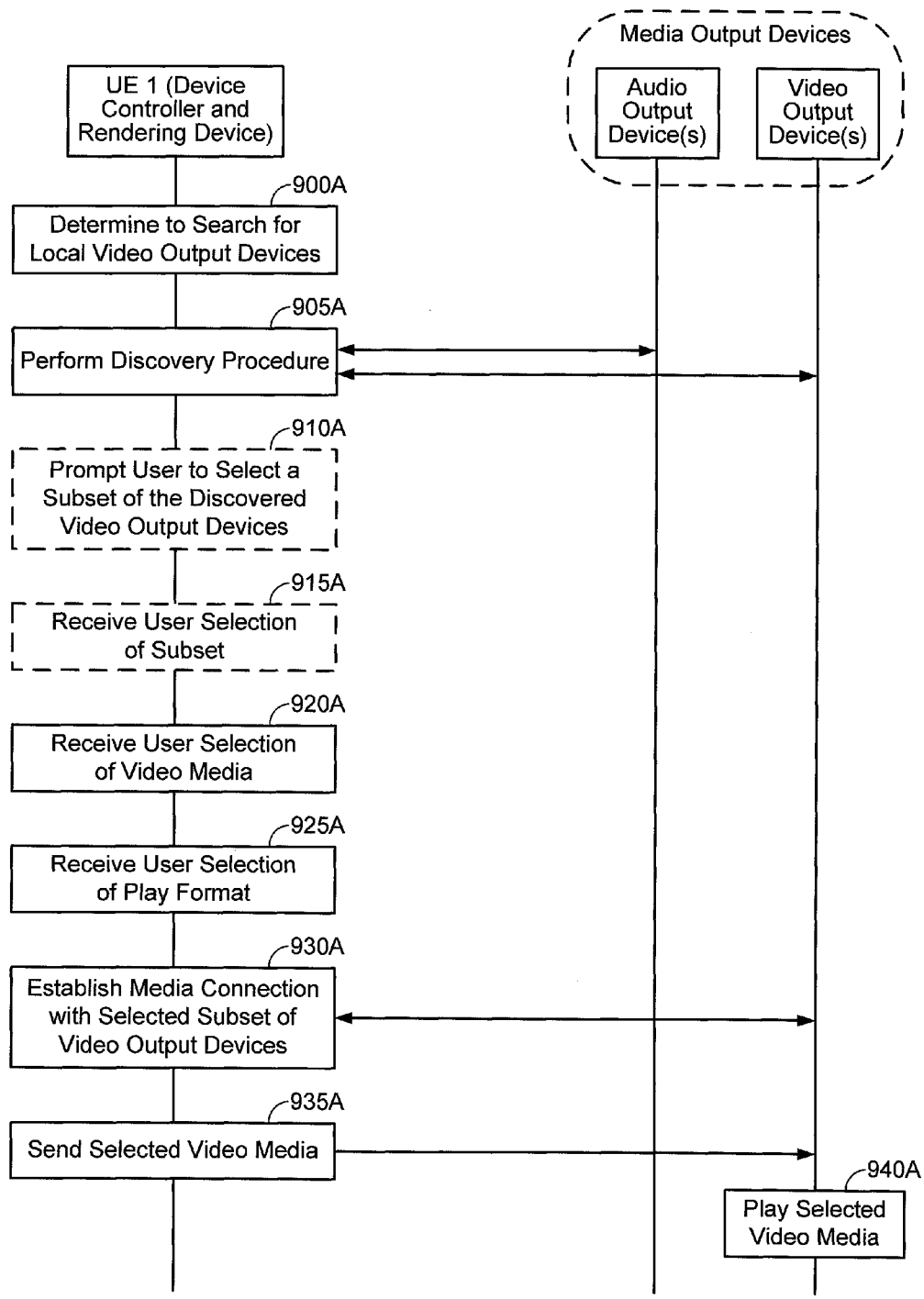
FIG. 9A illustrates an example implementation of FIG. 6 whereby the device controller function and the rendering device function are consolidated within a given user equipment in conjunction with set-up of a video presentation session in accordance with another embodiment of the invention.

Referring to FIG. 6, in conjunction with discovering the set of media output devices at 600, the device controller and/or the rendering device also determine the media output capabilities of each of the set media output devices, 605 (e.g., at 710A and/or 715A of FIG. 7A, 710C and/or 715C of FIG. 7C, 710D and/or 715D of FIG. 7D, 800A of FIG. 8A, 905A of FIG. 9A, and so on). As will be appreciated, there are different ways that the device controller and/or the rendering device can determine the media output capabilities for the set of media output devices at 605. In an example, device names associated with one or more of the media output devices in the set can be mapped to specific capabilities (e.g., a particular model of laptop is known to be capable of outputting 1080p video at 42 dB of volume from a look-up table that is accessible to the device controller and/or the rendering device, so detection of the model-type of the laptop corresponds to detection of its media output capabilities, etc.). In another example, one or more of the media output devices in the set can advertise their media output capabilities (e.g., via a periodic advertisement intercepted by the device controller and/or the rendering device, in response to a media output polling message from the device controller and/or the rendering device, etc.). In yet another example, the device controller and/or the rendering device can send "test" media for playback by one or more of the media output devices in the set. In a media playback test example, a media output device can be asked to play audio, and an audio recording device in proximity to the media output device can record the audio and report back to the device controller and/or rendering device to indicate whether the audio was played successful and an associated quality level. In another media playback test example, a media output device can be asked to play video, and a video recording device in proximity to the media output device can record the video and report back to the device controller and/or rendering device to indicate whether the video was played successful and an associated quality level. Thus, the device controller and/or rendering device can ascertain media output capabilities of the set of media output devices in a variety of ways (e.g., a name mapping in a media output capability index table, advertised capabilities and/or measured capabilities). For example, at 605, the device controller and/or the rendering device may detect that a user A is proximate to media output devices A, B and C, with media output device A being a speaker that can only output audio at a first quality level (e.g., volume, etc.) from five feet away from user A, media output device B being a tablet computer that can output audio at a second quality level from two feet away from user A and can also output video at a first quality level (e.g., screen-size, brightness, frame-rate, resolution, etc.) and media output device C is a video projector that can output video at a second quality level onto a viewing screen that is 10×12 feet in size at a distance of twenty feet from user A.

Next, the device controller and/or the rendering device select at least one subset of the set of media output devices to handle the output for at least one media type, 610 (e.g., as in 725A of FIG. 7A, 725C of FIG. 7C, 725D of FIG. 7D, 815A of FIG. 8A, 915A of FIG. 9A, and so on). For example, when audio media is to be targeted to user A, 610 may determine to use media output devices A and B at respective volume levels, or 610 may determine to split left and right stereo feeds between media output devices A and B, and so on. The selection of 610 can correspond to an input from one or more of the set of target users, an operator of the device controller and/or the rendering device or an autonomous (or automated) decision by the device controller and/or the rendering device themselves. For example, a set of six (6) audio output devices can be designated to provide 5.1 channel surround sound, and a set of two (2) video output devices (e.g., a projector and a tablet computer) can be designated to provide 480p and 1080p video, respectively, and a text output device can be designated to display textual information (e.g., an electronic scoreboard showing a score of a sports game that is being presented by the audio/video output devices). Thus, different media output devices that belong to the video output subset, for example, can be configured with different quality targets (e.g., 480p vs. 720p, split-screen video, different camera angles for a sports game, etc.) so that different media output devices within the same subset can output different versions of related content.

Referring to FIG. 6, at 615, the device controller and/or the rendering device obtains a set of media for presentation to the target set of users, whereby the set of media includes at least one type of media for which the at least one subset was selected at 610 (e.g., as in 700A or 705A of FIG. 7A, 700C or 705C of FIG. 7C, 700D or 705D of FIG. 7D, 805A of FIG.

8A, 900A of FIG. 9A, and so on). The device controller and/or the rendering device thereby deliver the set of media to the selected subset(s) of media output devices based on the media type(s) from the set of media to be presented to the set of target users, 620. Thus, if the set of media only includes audio, the audio is sent to the subset of the set of media output devices that were selected at 610 for audio output, and so on. As part of the delivery at 620, it will be appreciated that the device controller and/or the rendering device is configured to synchronize the playback of the media delivered to the set of media devices. The synchronization can include synchronization between media output devices in a particular selected subset, so that the audio played by each audio output device in an audio subset is synchronized for instance. The synchronization can further include synchronization between media output devices in different selected subsets, so that video frames output by a video output device(s) are aligned with a corresponding audio track being played by audio output device(s). It will be readily apparent to one of ordinary skill in the art how this type of synchronization can be achieved for any of the media delivery operations described below.

FIG. 7A illustrates an example implementation of FIG. 6 in accordance with an embodiment of the invention. Referring to FIG. 7A, UE 1 sends an audio multimedia message (e.g., a voicemail, an MP3 in an Email attachment, etc.) to UE 2, 700A. While not shown in FIG. 7A, the transfer of the audio multimedia message can occur over a communications network (e.g., a cellular access network, the Internet, etc.) or can alternatively be a P2P transmission (e.g., an IoT transmission over an IoT network). UE 2, which performs the device controller function in the embodiment of FIG. 7A, receives the audio multimedia message from UE 1, determines to present the audio multimedia message externally (e.g., in response to user input requesting presentation of the audio multimedia message not exclusively with speakers embedded in UE 2) and thereby UE 2 sends a request to the rendering device for outputting the audio multimedia message, 705A. As discussed above, in some embodiments, the rendering device can correspond to the device controller itself (i.e., UE 2), in which case the request of 705A can be omitted. Otherwise, the rendering device can be locally or remotely accessed by the device controller (i.e., UE 2) to exchange the request of 705A. The request of 705A can include the audio multimedia message to be presented, or alternatively a link (e.g., a hyperlink) or a reference to the audio multimedia message to be presented, in an example (e.g., such that 705A can correspond to 615 of FIG. 6), in which case the rendering device is expected to acquire the media to be presented on its own.

Referring to FIG. 7A, the rendering device receives the request to present the audio multimedia message and initiates a discovery procedure to identify a current set of media output devices in proximity to UE 2 and also to determine their respective media output capabilities, 710A (e.g., as in 600 and 605 of FIG. 6). The rendering device parses the discovered media output devices to identify the available audio output devices and notifies the device controller (i.e., UE 2) with respect to the available audio output devices, 715A. UE 2 prompts its user to select a subset of the available audio output devices for playing the audio multimedia message, 720A. UE 2 receives input indicative of the user's selection and notifies the rendering device of the selected subset of the available audio output devices, 725A (e.g., as in 610 of FIG. 6). In an embodiment of the invention, the user prompt operation of 720A-725A can be optional. For example, if only a single audio output device is discovered at 710A, the single audio output device can be selected by default because there are no other options for the user to select between. In another example, the device controller (i.e., UE 2) can track a history of the user's audio output device selections, such that if the user has a habit or history of selecting a particular set of audio output devices, the device controller can anticipate that selection without prompting the user to make the same selection again as in 720A-725A. On the other hand, if 720A and 725A are performed in FIG. 7A, the device controller can log the user's selection in the user's corresponding output device selection history. The rendering device establishes a media connection with each audio output device from the selected subset, 730A, the rendering device sends the audio multimedia message to the audio output devices from the selected subset over their respective media connections, 735A (e.g., as in 620 of FIG. 6), and the audio output devices from the selected subset play the audio multimedia message, 740A.

FIG. 7B illustrates an example media output device configuration in accordance with an embodiment of the invention. In FIG. 7B, a rendering device 700B detects a set of media output devices including a tablet computer 705B, mobile devices 710B and 715B, a receiver 720B coupled to a subwoofer and a video projector 725B. In the embodiment of FIG. 7B, the table computer 705B and the video projector 725B are included in a subset of media output devices for outputting video to a particular user, the mobile devices 710B and 715B are included in a subset of media output devices for outputting stereo sound (e.g., right and left stereo portions) to the user, and the receiver 720B is included in a subset of media output devices for outputting bass to the user.

FIG. 7C illustrates an example implementation of FIG. 6 in accordance with another embodiment of the invention. FIG. 7C is similar to FIG. 7A except for being directed to a video presentation session instead of an audio presentation session. Referring to FIG. 7C, UE 1 sends a video multimedia message (e.g., a link to a YouTube video, an Email attachment, etc.) to UE 2, 700C, whereby UE 2 performs the device controller function similar to FIG. 7A. While not shown in FIG. 7C, the transfer of the video multimedia message can occur over a communications network (e.g., a cellular access network, the Internet, etc.) or can alternatively be a P2P transmission. UE 2 receives the video multimedia message from UE 1, determines to present the video multimedia message externally (not with a display screen embedded in UE 2) and thereby UE 2 sends a request to the rendering device for outputting the video multimedia message, 705C. As discussed above, in some embodiments, the rendering device can correspond to the device controller itself (i.e., UE 2), in which case the request of 705C can be omitted. Otherwise, the rendering device can be locally or remotely accessed by the device controller (i.e., UE 2) to exchange the request of 705C. The request of 705C can include the video multimedia message to be presented, or alternatively a link (e.g., a hyperlink) or a reference to the video multimedia message to be presented (such as a YouTube link), in an example (e.g., such that 705C can correspond to 615 of FIG. 6), in which case the rendering device is expected to acquire the media to be presented on its own.

Referring to FIG. 7C, the rendering device receives the request 705C to present the video multimedia message and initiates a discovery procedure to identify a current set of media output devices in proximity to UE 2 and also to determine their respective media output capabilities, 710C (e.g., as in 600 and 605 of FIG. 6). The rendering device parses the discovered media output devices to identify the available video output devices and notifies the device controller (i.e., UE 2) with respect to the available video output devices, 715C. UE 2 prompts its user to select a subset of the available video output devices for playing the video multimedia message, 720C. UE 2 receives input indicative of the user's selection and notifies the rendering device of the selected subset of the available video output devices, 725C (e.g., as in 610 of FIG. 6). In an embodiment of the invention, the user prompt operation of 720C-725C can be optional. For example, if only a single video output device is discovered at 710C, the single video output device can be selected by default because there are no other options for the user to select between. In another example, the device controller (i.e., UE 2) can track a history of the user's video output device selections, such that if the user has a habit or history of selecting a particular set of video output devices, the device controller can anticipate that selection without prompting the user to make the same selection again as in 720C-725C. On the other hand, if 720C and 725C are performed in FIG. 7C, the device controller can log the user's selection in the user's corresponding output device selection history. The rendering device establishes a media connection with each video output device from the selected subset, 730C, the rendering device sends the video multimedia message to the video output devices from the selected subset over their respective media connections, 735C (e.g., as in 620 of FIG. 6), and the video output devices from the selected subset play the video multimedia message, 740C.

FIG. 7D illustrates an example implementation of FIG. 6 in accordance with another embodiment of the invention. FIG. 7D is similar to FIG. 7A or 7C except for being directed to a presentation session for both audio and video instead of an audio-only presentation session (e.g., FIG. 7A) or a video-only presentation session (e.g., FIG. 7C). Referring to FIG. 7D, UE 1 sends an audio+video multimedia message (e.g., a link to a YouTube video, an Email attachment, etc.) to UE 2, 700D, whereby UE 2 is configured to perform the device controller function similar to FIGS. 7A and 7C. While not shown in FIG. 7D, the transfer of the audio+video multimedia message can occur over a communications network (e.g., a cellular access network, the Internet, etc.) or can alternatively be a P2P transmission (or an IoT transmission). UE 2 receives the audio+video multimedia message from UE 1, determines to present the audio+video multimedia message externally (not with display screen and speakers embedded in UE 2) and thereby UE 2 sends a request to the rendering device for outputting the audio+video multimedia message, 705D. As discussed above, in some embodiments, the rendering device can correspond to the device controller itself (i.e., UE 2), in which case the request of 705D can be omitted. Otherwise, the rendering device can be locally or remotely accessed by the device controller (i.e., UE 2) to exchange the request of 705D. The request of 705D can include the audio+video multimedia message to be presented, or alternatively a link (e.g., a hyperlink) or a reference to the audio+video multimedia message to be presented (such as a YouTube link), in an example (e.g., such that 705D can correspond to 615 of FIG. 6), in which case the rendering device is expected to acquire the media to be presented on its own.

Referring to FIG. 7D, the rendering device receives the request to present the audio+video multimedia message and initiates a discovery procedure to identify a current set of media output devices in proximity to UE 2 and also to determine their respective media output capabilities, 710D (e.g., as in 600 and 605 of FIG. 6). The rendering device parses the discovered media output devices to identify the available video and audio output devices and notifies UE 2 with respect to the available video and audio output devices, 715D. UE 2 prompts its user to select (i) a first subset of the available video output devices for playing a video portion of the audio+video multimedia message, and also (ii) a second subset of the available audio output devices for playing an audio portion of the audio+video multimedia message 720D. UE 2 receives input indicative of the user's selections and notifies the rendering device of the selected first and second subsets, 725D (e.g., as in 610 of FIG. 6). In an embodiment of the invention, the user prompt operation of 720D-725D can be optional. For example, if only a single audio or video output device is discovered at 710D, the single audio or video output device can be selected by default because there are no other options for the user to select between. If a single video output device is detected but multiple audio devices are detected, the user can be prompted to select between the multiple audio devices without being asked to select between video output devices (and vice versa). In another example, the device controller (i.e., UE 2) can track a history of the user's audio and video output device selections, such that if the user has a habit or history of selecting a particular set of audio and/or video output devices, the device controller can anticipate those selections without prompting the user to make the same selections again as in 720D-725D. Alternatively, if the user consistently selects the same set of video output devices but is less consistent with his/her audio output device selections, the video output devices may be selected based on the user's selection history while the user is still prompted for a selection of the audio output devices. If 720D and 725D are performed in FIG. 7D for either the audio or video output devices, the device controller can log the user's selection(s) in the user's corresponding output device selection history. The rendering device establishes a media connection with each video output device from the selected first subset and also with each audio output device from the selected second subset, 730D. The rendering device sends the video portion of the audio+video multimedia message to the video output devices from the selected first subset over their respective media connections, 735D (e.g., as in 620 of FIG. 6), and the rendering device sends the audio portion of the audio+video multimedia message to the audio output devices from the selected second subset over their respective media connections, 740D (e.g., as in 620 of FIG. 6). The audio output devices from the selected second subset play the audio portion of the audio+video multimedia message, 745D, and the video output devices from the selected first subset play the video portion of the audio+video multimedia message, 750D.

While FIGS. 7A-7D relate to example implementations of delivering media to a set of media output devices in proximity to a single user (i.e., a user of UE 2), in other embodiments of the invention FIG. 6 can be directed to delivery of media to a group of target users. Accordingly, FIG. 8A is directed to an example implementation of the process of FIG. 6 with respect to ad-hoc group delivery of media to a set of target spectators of an event (e.g., a sports game at a sports stadium).

Figure 8B:
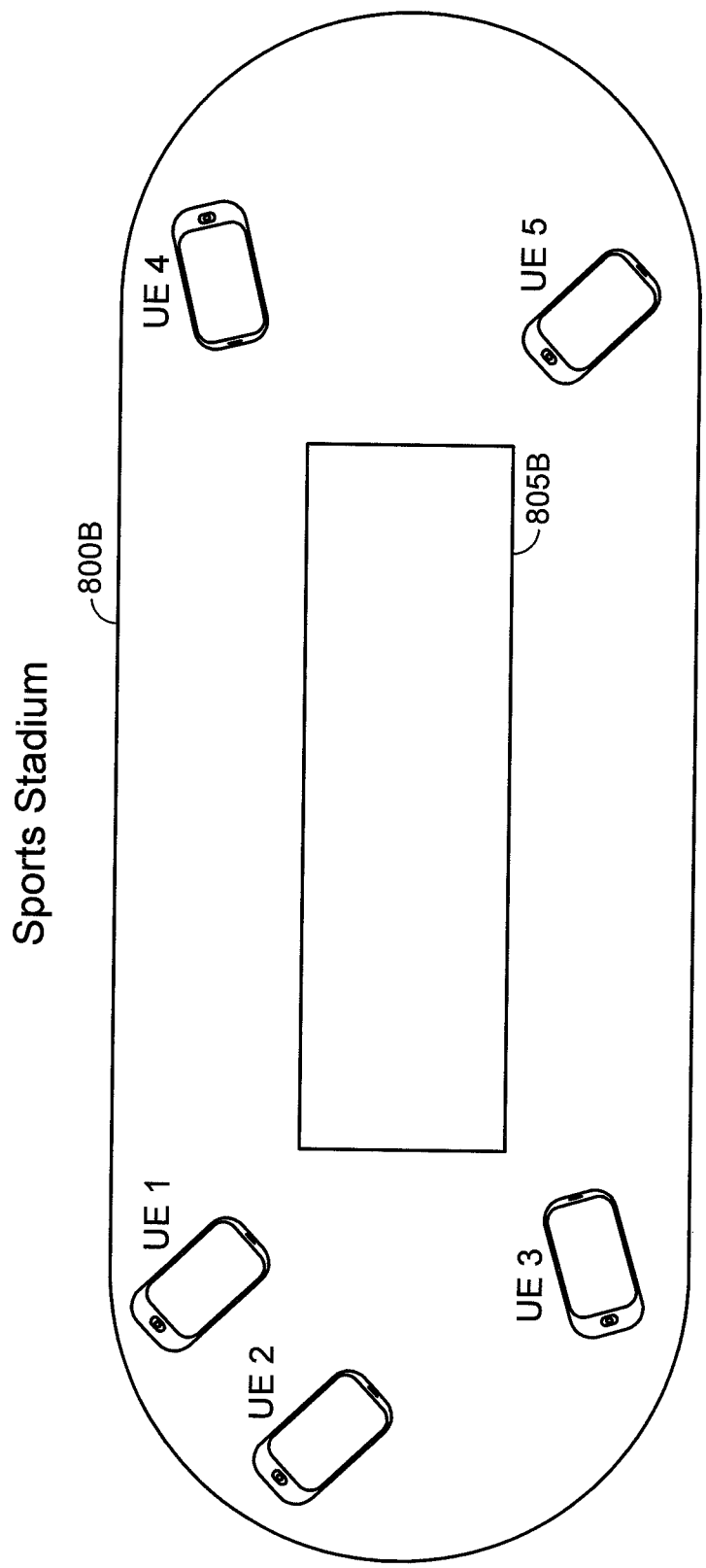
FIG. 8B illustrates a sports game event relevant to the process of FIG. 8A in accordance with another embodiment of the invention.

In the embodiment of FIG. 8A, the device controller function and the rendering device function are consolidated within a server that is configured to coordinate with a set of registered spectators at an event, such as a sports game. Thus, in FIG. 8A, the entity that makes the media output device selections for media delivery (i.e., the device controller function) is the same entity that ultimately renders the media and delivers the rendered media to the respective media output devices for presentation (i.e., the rendering device function). For example, as shown in FIG. 8B, the event is shown as occurring at a sports stadium 800B surrounding a sports field 805B. Also shown in FIG. 8B are UEs 1 . . . 5 positioned at different seats in the sports stadium 800B. Below, FIG. 8A is described with respect to FIG. 8B, although it will be readily appreciated how FIG. 8A could be alternatively implemented in other settings.

Referring to FIG. 8A, UEs 1 . . . N register with the server as being in attendance at the sports stadium 800B during an event, such as a sports game, 800A. The registration of 800A can occur in a number of ways. For example, the registration of 800A can occur by users of UEs 1 . . . N scanning their tickets to the event, or by the users of UEs 1 . . . N downloading and installing a location-aware mobile application controlled by the device controller. The registration of 800A corresponds collectively to 600, 605 and 610 of FIG. 6, in an example. At some point during the event, the server obtains audio media (and potentially other forms of media) for delivery to the registered spectators of the event, 805A (e.g., as in 615 of FIG. 6). For example, an operator of the server can attempt to deliver a rallying audio note to the registered spectators in the form of a "stadium wave" (e.g., a device-driven version of the more typical user-driven waves that occur at sports games). At 810A, the server establishes a media connection to each of the registered UEs 1 . . . N, 810A. Alternatively, the media connection may be previously established (e.g., at the registration of 800A) and simply maintained at 810A. The media connection of 810A can be an ad-hoc media connection, in an example, such that the registered UEs 1 . . . N form a P2P, ad-hoc or IoT group for sharing the audio media to be delivered thereto.

At 815A, the server generates a delivery schedule for the audio media so as to produce, upon presentation at the respective registered UEs 1 . . . N, a desired sound effect. For example, the desired sound effect can correspond to the stadium wave noted above, such that the audio media plays section-by-section in the sports stadium 800B in a sequential manner so that it appears that the audio media is "traveling" between the sections in a "wave" pattern. The delivery schedule can be based on the locations of the registered UEs 1 . . . N (e.g., their seat numbers or even their current locations based on location tracking), such that UEs located in different sections are allocated different times at which to play the audio media after delivery to approximate the stadium wave effect. Alternatively, the delivery schedule can be enforced by the delivery mechanism itself (e.g., if UEs 1 . . . N are in a P2P group, each UE can play the audio media before passing it on to a next UE so that the audio media will gradually travel around the sports stadium 800B). After generating the delivery schedule in 815A, the server delivers the audio media to the registered UEs 1 . . . N in accordance with the delivery schedule, 820A (e.g., as in 620 of FIG. 6), and the registered UEs 1 . . . N play the audio media, 825A.

While FIGS. 8A-8B illustrate an example whereby the device controller function and the rendering device function are consolidated within a server, FIGS. 9A through 9E illustrate an embodiment whereby the device controller function and the rendering device function can be consolidated within a given UE ("UE 1") in conjunction with set-up of a video presentation session. In particular, FIGS. 9A through 9E show how a user in control of UE 1 can manipulate how video is streamed to its local video output devices. Below, UE 1 is described as both the device controller and the rendering device, but it will be readily appreciated how UE 1 could instead be connected to another device that renders the video media to be streamed to the target device(s) and thereby performs the rendering device function, with UE 1 primarily functioning as a remote control (device controller). In this alternative scenario, UE 1 can be operated by a user as a remote control for interacting with an external rendering device in conjunction with set-up of the video presentation session. Accordingly, while not shown explicitly in FIG. 9A, the rendering device function can be performed externally via an independent processing device (not shown), similar to FIGS. 7A-7D.

Figure 9B:
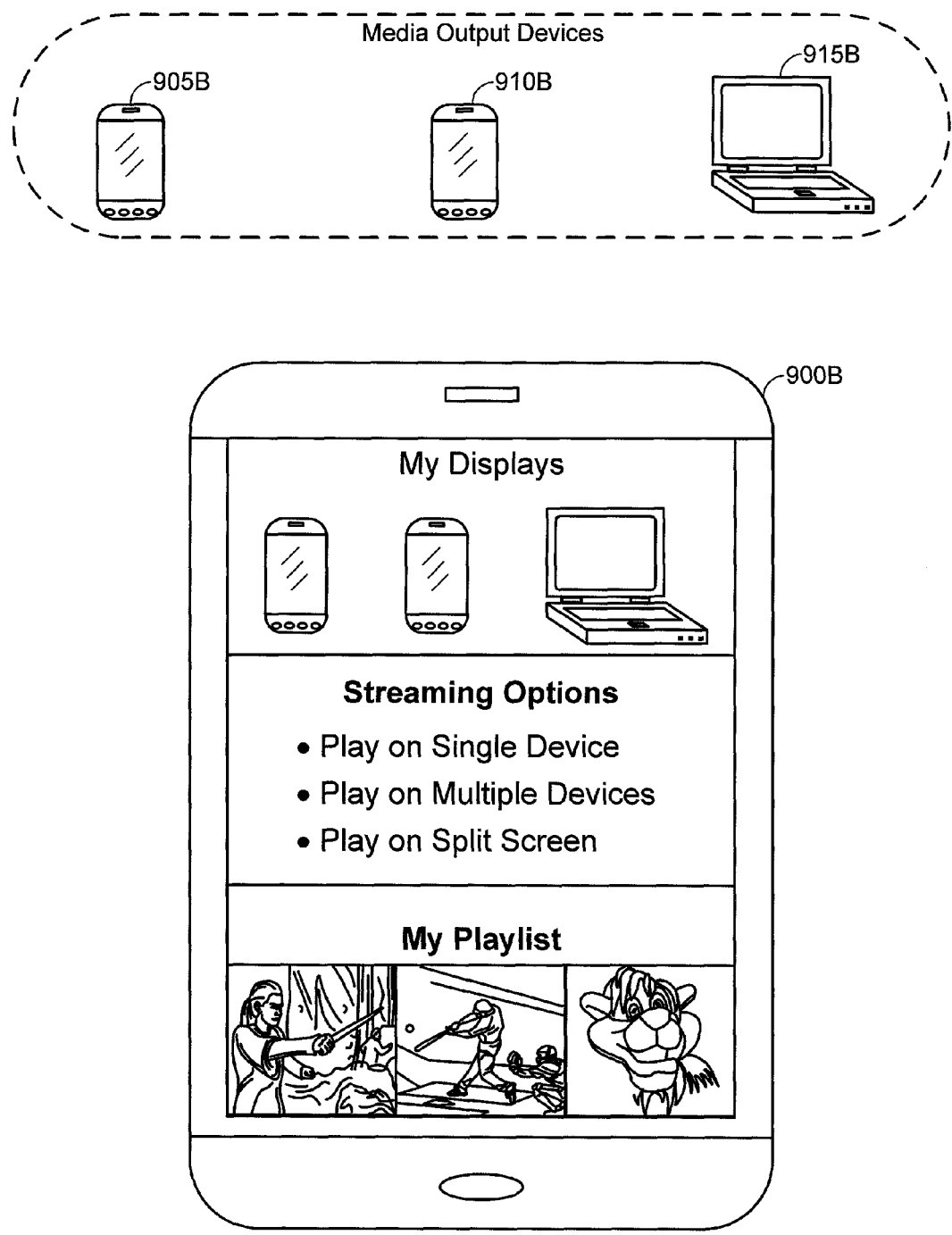
FIG. 9B illustrates an example of a user prompt screen that prompts a user to select between a variety of video output options, media options and play format options during the process of FIG. 9A in accordance with another embodiment of the invention.

Referring to FIG. 9A, UE 1 determines to search for local video output devices, 900A. In an example, the determination of 900A can occur in response to a user of UE 1 loading a multimedia application on UE 1 that relates to video output (e.g., a YouTube application, a TV application, etc.). UE 1 thereby initiates a discovery procedure to identify a current set of media output devices in proximity to UE 1 and also to determine their respective media output capabilities, 905A. UE 1 parses the discovered media output devices to identify the available video output devices and then prompts its user to select a subset of the discovered video output devices, 910A. While not shown in FIG. 9A, it is also possible that UE 1 can select one or more audio output devices to play an audio portion of the video media as well. In an embodiment of the invention, the user prompt of 910A can be optional. For example, if only a single video output device is discovered at 905A, the single video output device can be selected by default because there are no other options for which the user can select. In another example, UE 1 can track a history of the user's video output device selections, such that if the user has a habit or history of selecting a particular set of video output devices, UE 1 can anticipate that selection without prompting the user to make the same selection again as in 910A. On the other hand, if 910A performed in FIG. 9A, UE 1 can log the user's selection in the user's corresponding output device selection history once a selection is received at 915A. FIG. 9B illustrates an example of the user prompt at 910A of FIG. 9A. In FIG. 9B, the user of UE 1 is presented with a user prompt screen 900B that illustrates the available video output devices ("MyDisplays"), the streaming options for the video media ("PlayOnSingleDevice" which is shown in more detail in FIG. 9C, "PlayOnMultipleDevices" which is shown in more detail in FIG. 9D and "PlayOnSplitScreen" which is shown in more detail in FIG. 9E) and the available video media for streaming ("MyPlaylist"). The available video output devices are also shown in FIG. 9B as mobile device 905B, mobile device 910B and laptop 915B.

Referring to FIG. 9A, UE 1 receives a selection of the subset of video output devices that are to present the video media from the "MyDisplays" section of the user prompt screen 900B of FIG. 9B, 915A, a selection of the video media to be displayed from the "MyPlaylist" section of the user prompt screen 900B of FIG. 9B, 920A, and a selection of the play format by which the selected video media is to be presented (e.g., ("PlayOnSingleDevice", "PlayOnMultipleDevices" or "PlayOnSplitScreen" from the user prompt screen 900B of FIG. 9B), 925A. UE 1 then establishes a media connection with the selected subset of video output devices, 930A, UE 1 sends the selected video media to the selected subset of video output devices over the media connection in accordance with the selected play format, 935A, and the selected video output devices play the selected video media, 940A.

Figure 9C:
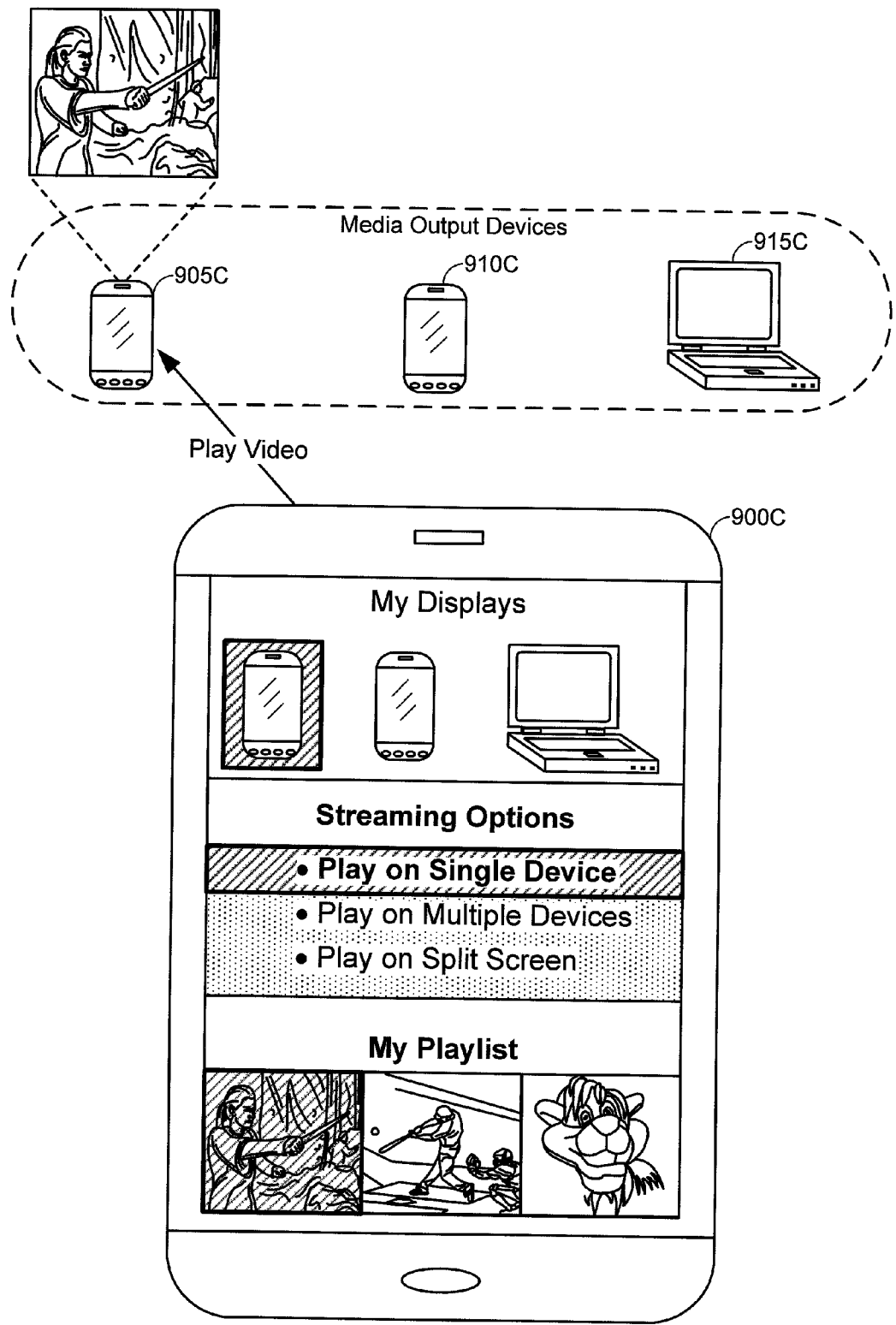
FIG. 9C illustrates an example of the process of FIG. 9A whereby the selected subset of video output devices corresponds to mobile device, the selected play format corresponds to "PlayOnSingleDevice" and the selected video media corresponds to a live-action movie in accordance with another embodiment of the invention.

FIG. 9C illustrates an example of the process of FIG. 9A whereby, as shown in user prompt screen 900C, the selected subset of video output devices corresponds to mobile device 905C, the selected play format corresponds to "PlayOnSingleDevice" and the selected video media corresponds to a live-action movie (e.g., Harry Potter). Accordingly, the selected live-action movie is streamed from UE 1 to the mobile device 905C (and not to the mobile device 910C or laptop 915C) which plays the selected live-action movie in full-screen mode (as opposed to a split-screen mode).

Figure 9D:
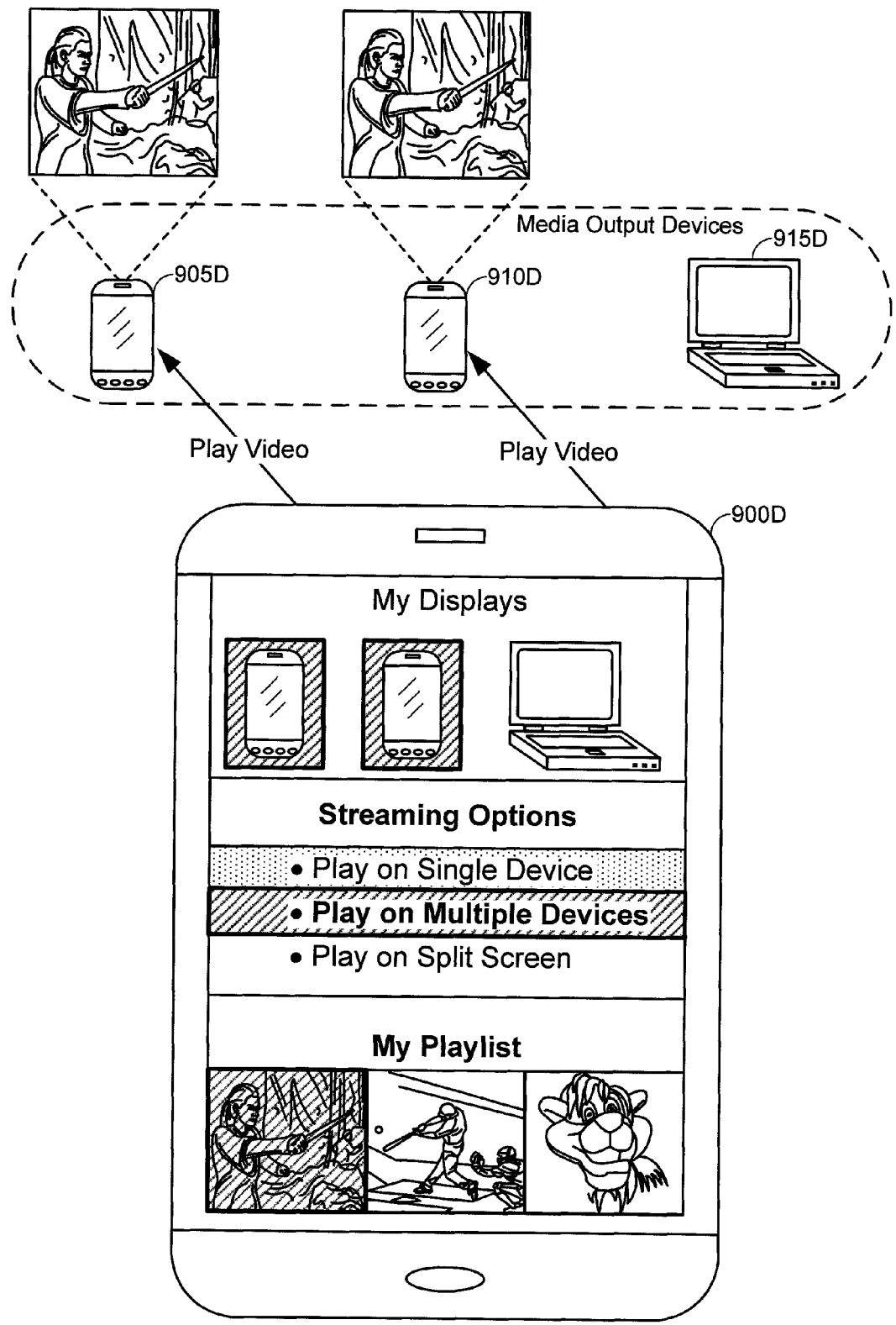
FIG. 9D illustrates an example of the process of FIG. 9A whereby the selected subset of video output devices corresponds to two mobile devices, the selected play format corresponds to "PlayOnMultipleDevices" and the selected video media corresponds to a live-action movie in accordance with another embodiment of the invention.

FIG. 9D illustrates an example of the process of FIG. 9A whereby, as shown in user prompt screen 900D, the selected subset of video output devices corresponds to mobile devices 905D and 910D, the selected play format corresponds to "PlayOnMultipleDevices" and the selected video media corresponds to a live-action movie (e.g., Harry Potter). Accordingly, the selected live-action movie is streamed from UE 1 to the mobile devices 905D and 910D (and not to the laptop 915D) which each plays the selected live-action movie in full-screen mode (as opposed to a split-screen mode).

Figure 9E:
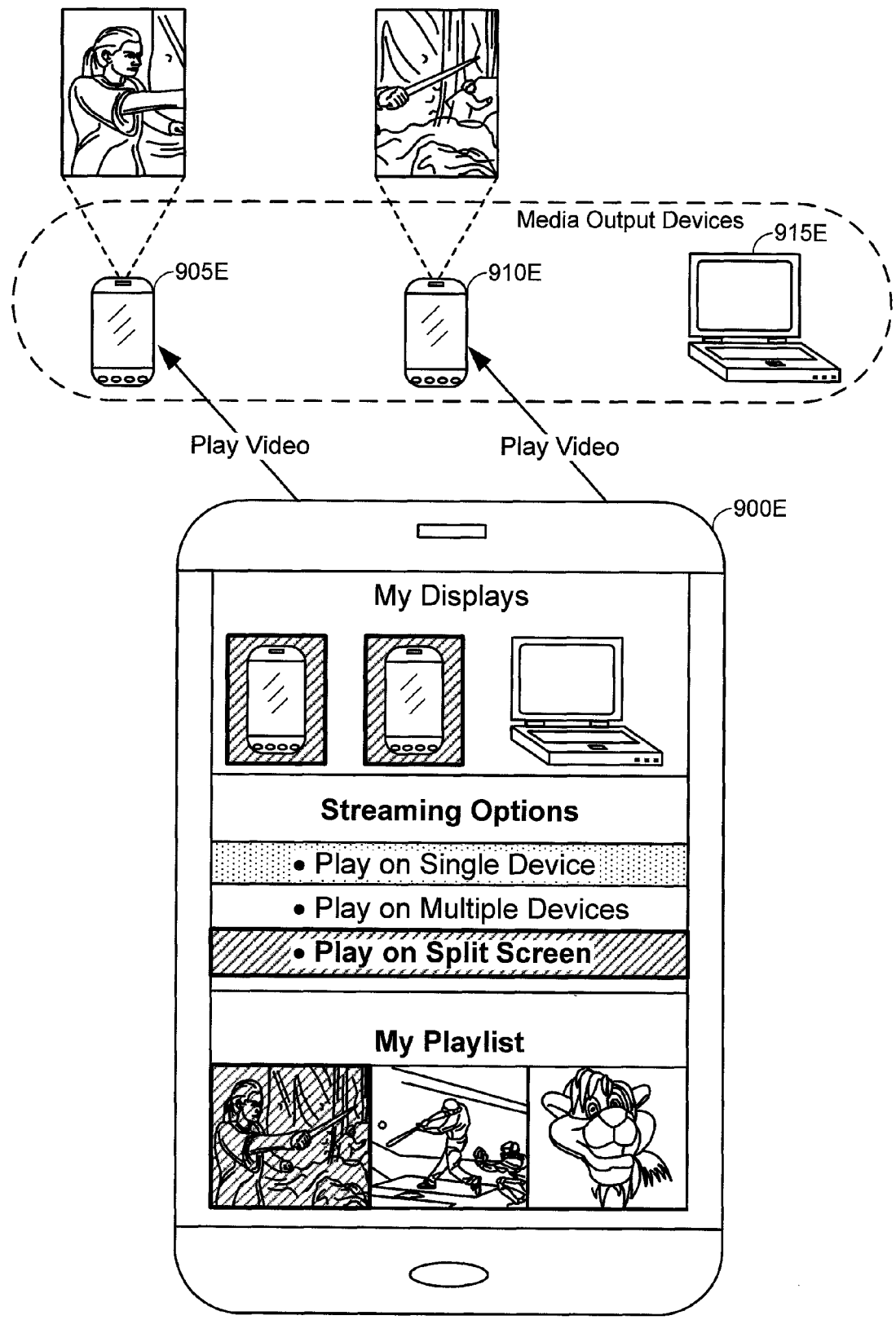
FIG. 9E illustrates an example of the process of FIG. 9A whereby the selected subset of video output devices corresponds to two mobile devices, the selected play format corresponds to "PlayOnSplitScreen" and the selected video media corresponds to a live-action movie in accordance with another embodiment of the invention.

FIG. 9E illustrates an example of the process of FIG. 9A whereby, as shown in user prompt screen 900E, the selected subset of video output devices corresponds to mobile devices 905E and 910E, the selected play format corresponds to "PlayOnSplitScreen" and the selected video media corresponds to a live-action movie (e.g., Harry Potter). Accordingly, UE 1 crops the selected video media into split-screen versions (e.g., a left and right split from the initial selected video media) and streams the cropped versions from UE 1 to the mobile devices 905E and 910E, respectively (and not to the laptop 915E) which each plays their respective cropped version of the selected live-action movie in split-screen mode (as opposed to a full-screen mode). In FIG. 9E, an example is illustrated whereby the "left" split of the movie is streamed to mobile device 905E and the "right" split of the movie is streamed to mobile device 910E. While not shown in FIG. 9E explicitly, the user could hold mobile devices 905E and 910E next to each other so as to simulate a bigger screen for the movie.

Any of the aforementioned embodiments can be implemented within a P2P environment, an ad-hoc environment and/or an IoT environment. Alternatively, one or more of the aforementioned embodiments may be directed to an implementation where the device controller is remote from the user for which the media is to be presented. Further, while most of the above-described embodiments characterize certain target media devices as playing audio data while other target media devices play video data, it is also possible that one or more of the target devices would be part of both audio and video playback groups. Using the system of FIG. 7B as an example, tablet computer 705B could be asked by the rendering device 700B to play both a portion of the video media while also outputting a portion of the audio media as well, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of directing a presentation of a multimedia message at a device controller, comprising:
    determining to direct presentation of the multimedia message in proximity to at least one user;
    initiating, in response to the determination to direct presentation of the multimedia message, a dynamic discovery procedure to detect media output devices that are currently in proximity to the at least one user;
    determining, in response to the dynamic discovery procedure, a first subset of the detected media output devices configured to present a first media type to the at least one user;
    determining, in response to the dynamic discovery procedure, a second subset of the detected media output devices that is different from the first subset and is configured to present a second media type to the at least one user;
    directing a first portion of the multimedia message that corresponds to the first media type to be delivered to the first subset for presentation to the at least one user; and
    directing a second portion of the multimedia message that corresponds to the second media type to be delivered to the second subset for presentation to the at least one user in synchronization with the presentation of the first portion of the multimedia message, wherein the first media type is audio and the second media type is video.

2. The method of claim 1, wherein the directing of the first portion of the multimedia message and the directing of the second portion of the multimedia message include:
    obtaining, by the device controller, the multimedia message for presentation to the at least one user that includes the first and second portions of the multimedia message;
    delivering, by the device controller, the first portion of the multimedia message to the first subset for presentation to the at least one user; and
    delivering, by the device controller, the second portion of the multimedia message to the second subset for presentation to the at least one user in synchronization with the presentation of the first portion of the multimedia message.

3. The method of claim 1, wherein the directing of the first portion of the multimedia message and the directing of the second portion of the multimedia message include:
    requesting a rendering device that is independent of the device controller to deliver the first and second portions of the multimedia message to the first and second subsets, respectively, for presentation to the at least one user in synchronization with the presentation of the first portion of the multimedia message.

4. The method of claim 1, wherein the first subset includes a plurality of media output devices that surround the at least one user to achieve a surround sound effect.

5. The method of claim 4, wherein the second subset includes a plurality of media output devices that are configured to present the video in different formats, resolutions, screen-sizes and/or orientations with respect to the at least one user.

6. The method of claim 1, wherein the directing of the first portion directs the first portion of the multimedia message to be delivered to the first subset via a wireless transmission.

7. The method of claim 1, wherein the directing of the second portion directs the second portion of the multimedia message to be delivered to the second subset via a wireless transmission.

8. The method of claim 1, wherein the determining of the first subset includes:
    identifying media output capabilities for a plurality of the detected media output devices detected by the dynamic discovery procedure;
    obtaining a selection of a set of the plurality of detected media output devices for achieving a media output effect based on the identified media output capabilities,
    wherein the selected set of the plurality of detected media output devices corresponds to the first subset.

9. The method of claim 8, wherein the media output effect is a surround sound effect.

10. The method of claim 1, wherein the determining of the second subset includes:
    identifying media output capabilities for a plurality of the detected media output devices detected by the dynamic discovery procedure;
    obtaining a selection of a set of the plurality of detected media output devices for achieving a media output effect based on the identified media output capabilities,
    wherein the selected set of the plurality of detected media output devices corresponds to the second subset.

11. The method of claim 10, wherein the media output effect is a split-screen video effect that plays different non-overlapping sections of the second portion of the multimedia message on display screens of different media output devices in the second subset.

12. The method of claim 10, wherein the media output effect is a multiple-screen video effect that plays overlapping sections of the second portion of the multimedia message on display screens of different media output devices in the second subset.

13. The method of claim 1, wherein the determining of the first subset includes:
    prompting an operator of the device controller to select between a group of the detected media output devices configured to present the first media type; and
    receiving an indication of the first subset of the detected media output devices in response to the operator prompt.

14. The method of claim 1, wherein the determining of the second subset includes:
    prompting an operator of the device controller to select between a group of the detected media output devices configured to present the second media type; and
    receiving an indication of the second subset of the detected media output devices in response to the operator prompt.

15. The method of claim 1, wherein the determining of the first subset includes:
    automatically selecting, on behalf of an operator of the device controller, the first subset of the detected media output devices from a group of the detected media output devices configured to present the first media type.

16. The method of claim 15, wherein the automatically selecting is performed in lieu of an operator prompt based on (i) the group of the detected media output devices configured to present the first media type corresponding to a single media output device, and/or (ii) a history of the operator selecting the first subset of the detected media output devices.

17. The method of claim 1, wherein the determining of the second subset includes:
    automatically selecting, on behalf of an operator of the device controller, the second subset of the detected media output devices from a group of the detected media output devices configured to present the second media type.

18. The method of claim 17, wherein the automatically selecting is performed in lieu of an operator prompt based on (i) the group of the detected media output devices configured to present the second media type corresponding to a single media output device, and/or (ii) a history of the operator selecting the second subset of the detected media output devices.

19. The method of claim 1, wherein the device controller corresponds to (i) a mobile communications device that is operated by a given user among the at least one user, or (ii) a server that is in communication with at least one mobile communications device operated by the at least one user.

20. The method of claim 19, wherein the mobile communications device operated by the given user is one of the detected media output devices in the first subset.

21. The method of claim 1, wherein the first subset includes a single media output device.

22. The method of claim 1, wherein the first subset includes two or more media output devices.

23. The method of claim 1, wherein the second subset includes a single media output device.

24. The method of claim 1, wherein the second subset includes two or more media output devices.

25. The method of claim 1, wherein at least one media output device in the first subset is also in the second subset, such that media content from both the first and second portions of the multimedia message is directed to the at least one media output device for presentation.

26. The method of claim 1, wherein at least one video output device in the first subset is a mobile device.

27. The method of claim 1, wherein at least one of the two or more detected media output devices is a mobile device.

28. A method of directing a presentation of media at a device controller, comprising:
    initiating a dynamic discovery procedure to detect media output devices that are currently in proximity to at least one user;
    determining, in response to the dynamic discovery procedure, a first subset that includes two or more of the detected media output devices configured to present a first media type to the at least one user by identifying media output capabilities for a plurality of the detected media output devices detected by the dynamic discovery procedure, obtaining a selection of a set of the plurality of the detected media output devices for achieving a media output effect based on the identified media output capabilities, wherein the selected set of the detected media output devices corresponds to the first subset; and
    directing a first portion of the media that corresponds to the first media type to be delivered to the first subset for synchronized presentation by each of the two or more detected media output devices to the at least one user,
    wherein the first media type is video.

29. The method of claim 28, wherein the directing includes:
    obtaining, by the device controller, the media for presentation to the at least one user that includes the first portion of the media; and
    delivering, by the device controller, the first portion of the media to the first subset for presentation to the at least one user.

30. The method of claim 28, wherein the directing includes:
    requesting a rendering device that is independent of the device controller to deliver the first portion of the media to each media output device in the first subset for presentation to the at least one user.

31. The method of claim 28, wherein the first subset includes a plurality of media output devices configured to present the video in different formats, resolutions, screen-sizes and/or orientations with respect to the at least one user.

32. The method of claim 28, further comprising:
    determining, in response to the dynamic discovery procedure, a second subset of the detected media output devices that is different from the first subset and is configured to present a second media type to the at least one user; and
    directing a second portion of the media that corresponds to the second media type to be delivered to the second subset for presentation to the at least one user in synchronization with the presentation of the first portion of the media.

33. The method of claim 32, wherein the directing of the second portion of the media includes:
    obtaining the media for presentation to the at least one user that includes the second portion of the media;
    delivering the second portion of the media to the second subset for presentation to the at least one user in synchronization with the presentation of the first portion of the media.

34. The method of claim 32, wherein the directing of the second portion of the media includes:
    requesting a rendering device that is independent of the device controller to deliver the second portion of the media to the second subset for presentation to the at least one user in synchronization with the presentation of the first portion of the media.

35. The method of claim 32, wherein the second media type is audio.

36. The method of claim 28, wherein the directing directs the first portion of the media to be delivered to the first subset via a wireless transmission.

37. The method of claim 28, wherein the media output effect is a split-screen video effect that plays different non-overlapping sections of the first portion of the media on display screens of different media output devices in the first subset.

38. The method of claim 28, wherein the media output effect is a multiple-screen video effect that plays overlapping sections of the first portion of the media on display screens of different media output devices in the first subset.

39. The method of claim 28, wherein the determining includes:
    prompting an operator of the device controller to select between a group of the detected media output devices configured to present the first media type; and
    receiving an indication of the first subset of the detected media output devices in response to the operator prompt.

40. The method of claim 28, wherein the determining includes:
    automatically selecting, on behalf of an operator of the device controller, the first subset of the detected media output devices from a group of the detected media output devices configured to present the first media type.

41. The method of claim 40, wherein the automatically selecting is performed in lieu of an operator prompt based on a history of the operator selecting the first subset of the detected media output devices.

42. The method of claim 28, wherein the device controller corresponds to (i) a mobile communications device that is operated by a given user among the at least one user, or (ii) a server that is in communication with at least one mobile communications device operated by the at least one user.

43. The method of claim 42, wherein the mobile communications device operated by the given user is one of the detected media output devices in the first subset.

44. The method of claim 28, wherein at least one audio output device in the second subset is a mobile device.

45. A device controller configured to direct a presentation of a multimedia message at a device controller, comprising:
   means for determining to direct presentation of the multimedia message in proximity to at least one user;
   means for initiating, in response to the determination to direct presentation of the multimedia message, a dynamic discovery procedure to detect media output devices that are currently in proximity to the at least one user;
   means for determining, in response to the dynamic discovery procedure, a first subset of the detected media output devices configured to present a first media type to the at least one user;
   means for determining, in response to the dynamic discovery procedure, a second subset of the detected media output devices that is different from the first subset and is configured to present a second media type to the at least one user;
   means for directing a first portion of the multimedia message that corresponds to the first media type to be delivered to the first subset for presentation to the at least one user; and
   means for directing a second portion of the multimedia message that corresponds to the second media type to be delivered to the second subset for presentation to the at least one user in synchronization with the presentation of the first portion of the multimedia message, wherein the first media type is audio and the second media type is video.

46. A device controller configured to directing a presentation of media at a device controller, comprising:
   means for initiating a dynamic discovery procedure to detect media output devices that are currently in proximity to at least one user;
   means for determining, in response to the dynamic discovery procedure, a given subset that includes two or more of the detected media output devices configured to present a given media type to the at least one user by identifying media output capabilities for a plurality of the detected media output devices detected by the dynamic discovery procedure, obtaining a selection of a set of the plurality of the detected media output devices for achieving a media output effect based on the identified media output capabilities, wherein the selected set of the detected media output devices corresponds to the first subset; and
   means for directing a given portion of the media that corresponds to the given media type to be delivered to the given subset for synchronized presentation by each of the two or more detected media output devices to the at least one user,
   wherein the first media type is video.

47. A device controller configured to direct a presentation of a multimedia message at a device controller, comprising:
   logic configured to determine to direct presentation of the multimedia message in proximity to at least one user;
   logic configured to initiate, in response to the determination to direct presentation of the multimedia message, a dynamic discovery procedure to detect media output devices that are currently in proximity to the at least one user;
   logic configured to determine, in response to the dynamic discovery procedure, a first subset of the detected media output devices configured to present a first media type to the at least one user;
   logic configured to determine, in response to the dynamic discovery procedure, a second subset of the detected media output devices that is different from the first subset and is configured to present a second media type to the at least one user;
   logic configured to direct a first portion of the multimedia message that corresponds to the first media type to be delivered to the first subset for presentation to the at least one user; and
   logic configured to direct a second portion of the multimedia message that corresponds to the second media type to be delivered to the second subset for presentation to the at least one user in synchronization with the presentation of the first portion of the multimedia message,
   wherein the first media type is audio and the second media type is video.

48. A device controller configured to directing a presentation of media at a device controller, comprising:
   logic configured to initiate a dynamic discovery procedure to detect media output devices that are currently in proximity to at least one user;
   logic configured to determine, in response to the dynamic discovery procedure, a given subset that includes two or more of the detected media output devices configured to present a given media type to the at least one user by identifying media output capabilities for a plurality of the detected media output devices detected by the dynamic discovery procedure, obtaining a selection of a set of the plurality of the detected media output devices for achieving a media output effect based on the identified media output capabilities, wherein the selected set of the detected media output devices corresponds to the first subset; and
   logic configured to direct a given portion of the media that corresponds to the given media type to be delivered to the given subset for synchronized presentation by each of the two or more detected media output devices to the at least one user,
   wherein the first media type is video.

49. A non-transitory computer-readable medium containing instructions stored thereon, which, when executed by a device controller configured to direct a presentation of a multimedia message at a device controller, cause the device controller to perform actions, the instructions comprising:
   at least one instruction configured to cause the device controller to direct presentation of the multimedia message in proximity to at least one user;
   at least one instruction configured to cause the device controller to initiate, in response to the determination to direct presentation of the multimedia message, a dynamic discovery procedure to detect media output devices that are currently in proximity to the at least one user;
   at least one instruction configured to cause the device controller to determine, in response to the dynamic discovery procedure, a first subset of the detected media output devices configured to present a first media type to the at least one user;
   at least one instruction configured to cause the device controller to determine, in response to the dynamic discovery procedure, a second subset of the detected media output devices that is different from the first subset and is configured to present a second media type to the at least one user;

at least one instruction configured to cause the device controller to direct a first portion of the multimedia message that corresponds to the first media type to be delivered to the first subset for presentation to the at least one user; and at least one instruction configured to cause the device controller to direct a second portion of the multimedia message that corresponds to the second media type to be delivered to the second subset for presentation to the at least one user in synchronization with the presentation of the first portion of the multimedia message, wherein the first media type is audio and the second media type is video.

50. A non-transitory computer-readable medium containing instructions stored thereon, which, when executed by a device controller configured to direct a presentation of media at a device controller, cause the device controller to perform actions, the instructions comprising:

at least one instruction configured to cause the device controller to initiate a dynamic discovery procedure to detect media output devices that are currently in proximity to at least one user;

at least one instruction configured to cause the device controller to determine, in response to the dynamic discovery procedure, a given subset that includes two or more of the detected media output devices configured to present a given media type to the at least one user by identifying media output capabilities for a plurality of the detected media output devices detected by the dynamic discovery procedure, obtaining a selection of a set of the plurality of the detected media output devices for achieving a media output effect based on the identified media output capabilities, wherein the selected set of the detected media output devices corresponds to the first subset; and at least one instruction configured to cause the device controller to direct a given portion of the media that corresponds to the given media type to be delivered to the given subset for synchronized presentation by each of the two or more detected media output devices to the at least one user, wherein the first media type is video.

* * * * *